(12) United States Patent
Uchida et al.

(10) Patent No.: US 8,675,260 B2
(45) Date of Patent: Mar. 18, 2014

(54) IMAGE PROCESSING METHOD AND APPARATUS, AND DOCUMENT MANAGEMENT SERVER, PERFORMING CHARACTER RECOGNITION ON A DIFFERENCE IMAGE

(75) Inventors: Shigeo Uchida, Mishima (JP); Taira Ashikawa, Kawasaki (JP); Satoshi Oyama, Mishima (JP); Katsuhito Mochizuki, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 147 days.

(21) Appl. No.: 13/420,515

(22) Filed: Mar. 14, 2012

(65) Prior Publication Data

US 2012/0236368 A1     Sep. 20, 2012

(30) Foreign Application Priority Data

Mar. 18, 2011     (JP) ................. 2011-061717

(51) Int. Cl.
*G06F 3/12* (2006.01)
*H04N 1/00* (2006.01)
*H04N 1/387* (2006.01)
*G06K 9/00* (2006.01)
*G06K 9/34* (2006.01)
*G06K 9/64* (2006.01)
*G06K 9/80* (2006.01)
*H04N 1/32* (2006.01)
*G06K 15/02* (2006.01)
*G06T 7/00* (2006.01)

(52) U.S. Cl.
CPC ............ *G06F 3/1208* (2013.01); *G06F 3/1252* (2013.01); *G06F 3/1253* (2013.01); *H04N 1/00222* (2013.01); *H04N 1/32133* (2013.01); *H04N 1/00482* (2013.01); *G06K 9/00442* (2013.01); *G06K 9/00469* (2013.01); *G06K 9/00496* (2013.01); *G06K 9/344* (2013.01); *G06K 9/64* (2013.01); *G06K 9/80* (2013.01); *G06K 15/1822* (2013.01); *G06K 15/1889* (2013.01); *G06T 7/00* (2013.01)
USPC .......... 358/2.1; 358/3.28; 358/1.18; 358/450; 358/462; 382/176; 382/179; 382/186; 382/218; 382/278; 382/292

(58) Field of Classification Search
USPC ........ 358/2.1, 1.9, 3.28, 1.13, 1.18, 450, 462; 382/100, 173, 176, 177, 179, 181, 186, 382/187, 190, 195, 197, 198, 217–219, 382/286–296, 278
See application file for complete search history.

(56) References Cited

U.S. PATENT DOCUMENTS

| | | | |
|---|---|---|---|
| 7,461,789 B2* | 12/2008 | Katsurabayashi et al. | 235/494 |
| 7,568,170 B2* | 7/2009 | Shiono et al. | 345/473 |
| 7,936,373 B2* | 5/2011 | Masumoto et al. | 358/1.18 |
| 8,068,244 B2* | 11/2011 | Uejo | 358/1.14 |
| 8,089,648 B2* | 1/2012 | Chung et al. | 358/1.15 |
| 8,130,406 B2* | 3/2012 | Yano et al. | 358/1.18 |
| 8,514,443 B2* | 8/2013 | Goto et al. | 358/1.18 |
| 2011/0102853 A1* | 5/2011 | Makishima et al. | 358/3.28 |

FOREIGN PATENT DOCUMENTS

| | | |
|---|---|---|
| JP | 2006-031548 | 2/2006 |
| JP | 2009-165088 | 7/2009 |
| JP | 2011-065373 | 3/2011 |

* cited by examiner

*Primary Examiner* — Scott A Rogers
(74) *Attorney, Agent, or Firm* — Patterson & Sheridan, L.L.P.

(57) ABSTRACT

According to one embodiment, the image processing apparatus includes a printing control unit, an image reading unit, an extracting unit, a difference image extracting unit, and a determination unit. The printing control unit controls printing of a plurality of pages on one sheet of paper according to a print setting information which indicates a printing form, and printing of a code indicating the print setting information on the paper. The image reading unit read the paper. The extracting unit extracts the code from the read image. The difference image extracting unit extracts a difference image between the printed image and the read image.

20 Claims, 17 Drawing Sheets

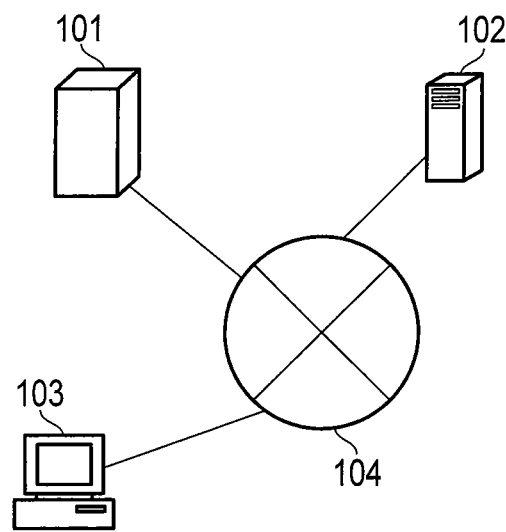
F I G. 1
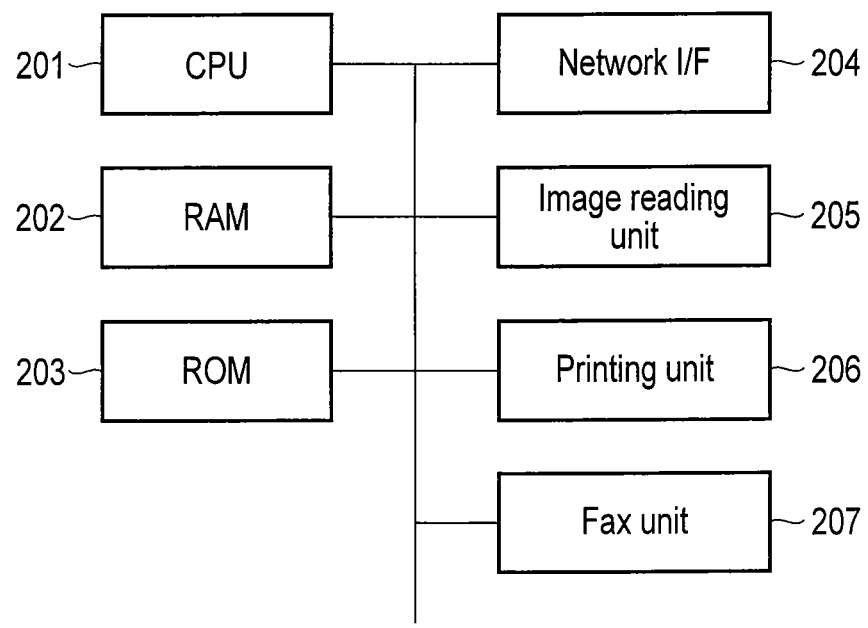
F I G. 2

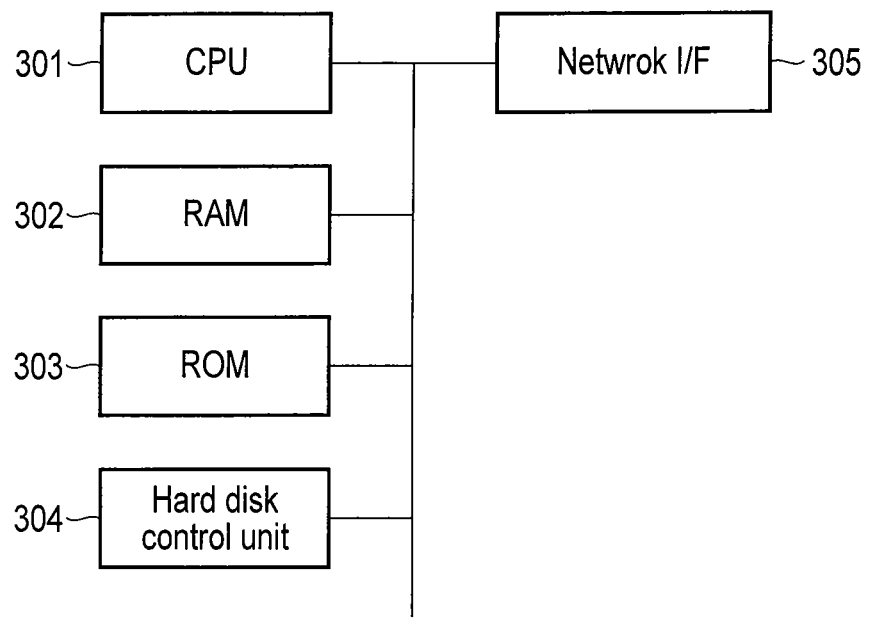
F I G. 3
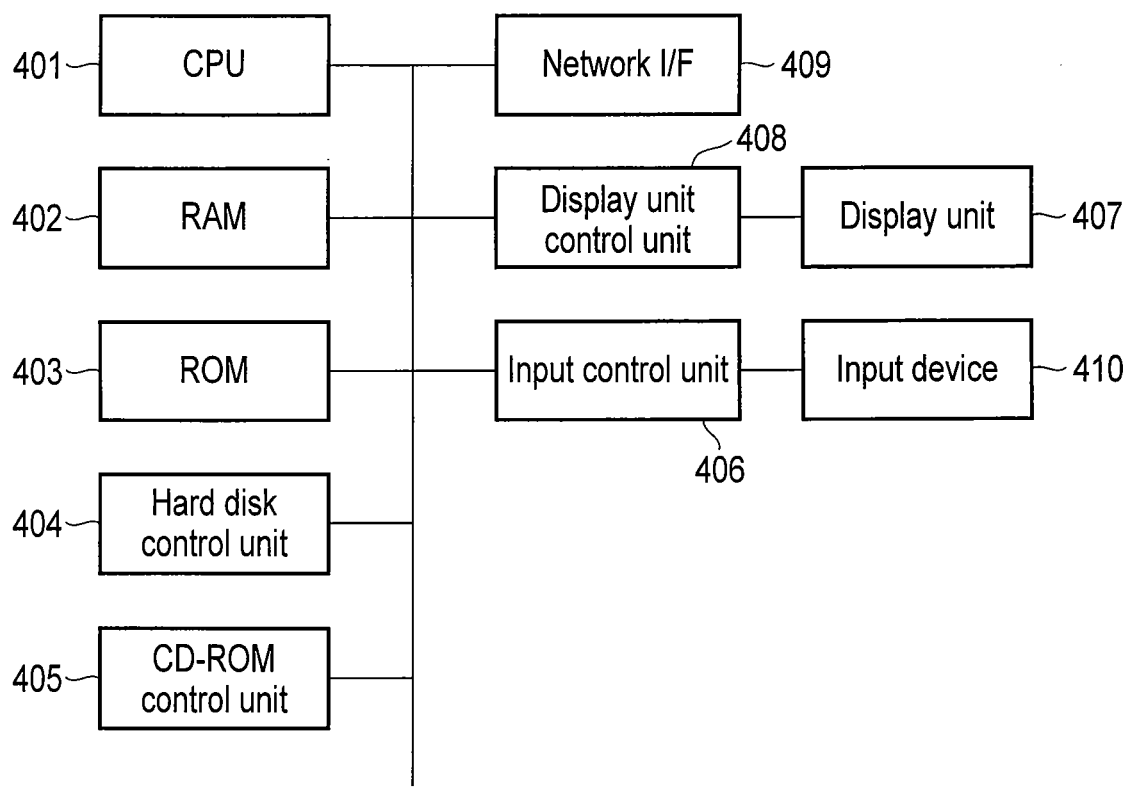
F I G. 4

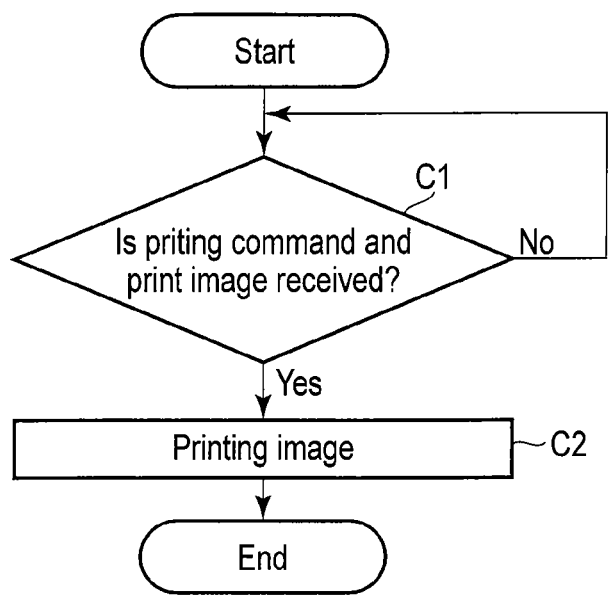

FIG. 7

| Print setting | | | |
|---|---|---|---|
| Please select print setting item. | | | |
| | | 1003 | 1004 |
| Nin1 | Double side | Printing direction | Color mode |
| Non n-in-1<br>2-in-1<br>4-in-1<br>6-in-1<br>8-in-1<br>9-in-1<br>12-in-1 | Signle side<br>Double side (closing short side)<br>Double side (closing long side)<br>1002 | Horizontally forward<br>Vertically forward<br>Horizonrally reverse<br>Vertically reverse | Full color<br>Gray scale<br>Monochrome |
| 1001 | | | Settlement |

FIG. 8

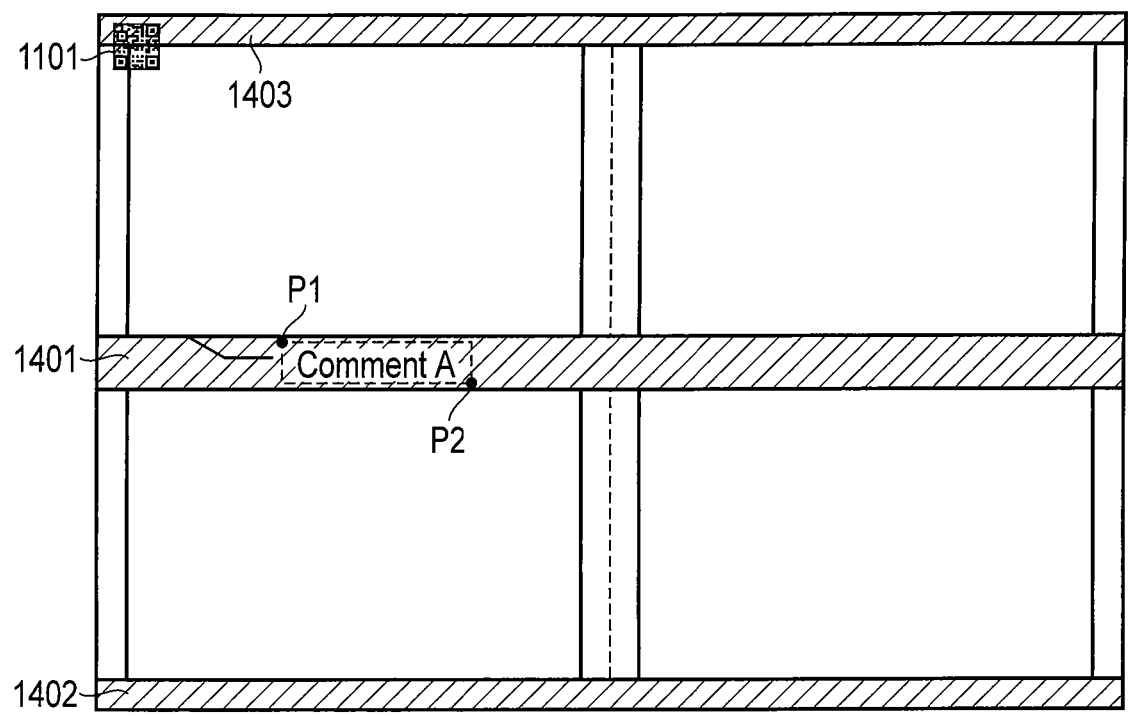
F I G. 14
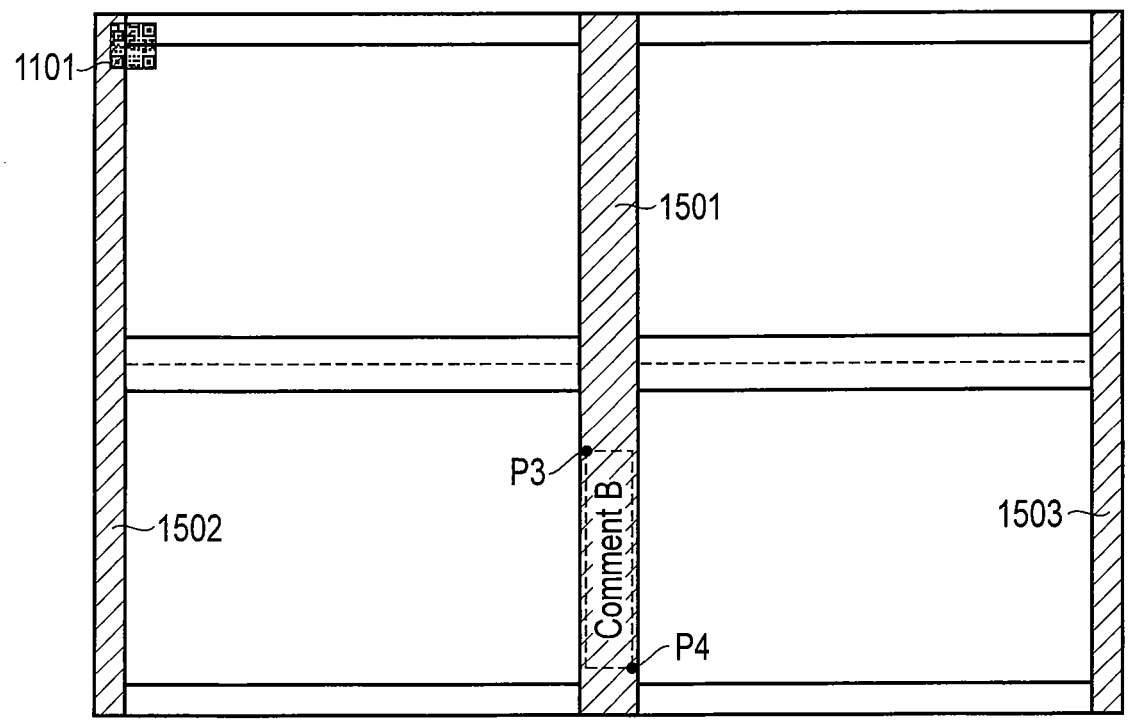
F I G. 15

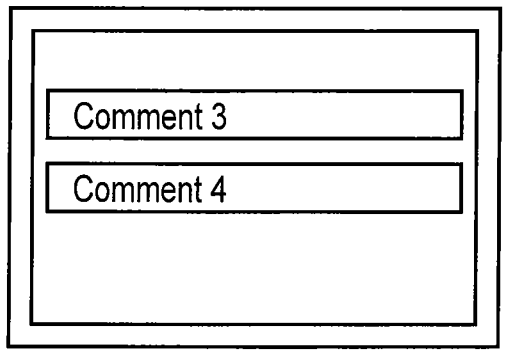 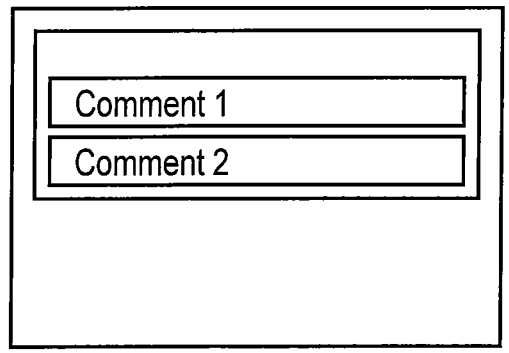
F I G. 23A  F I G. 23B
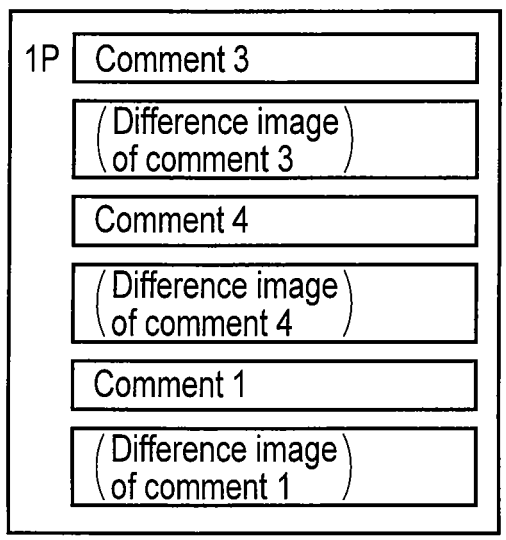 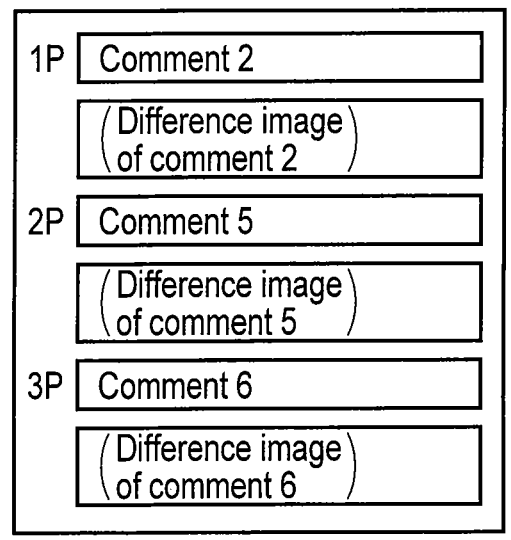
F I G. 24A  F I G. 24B

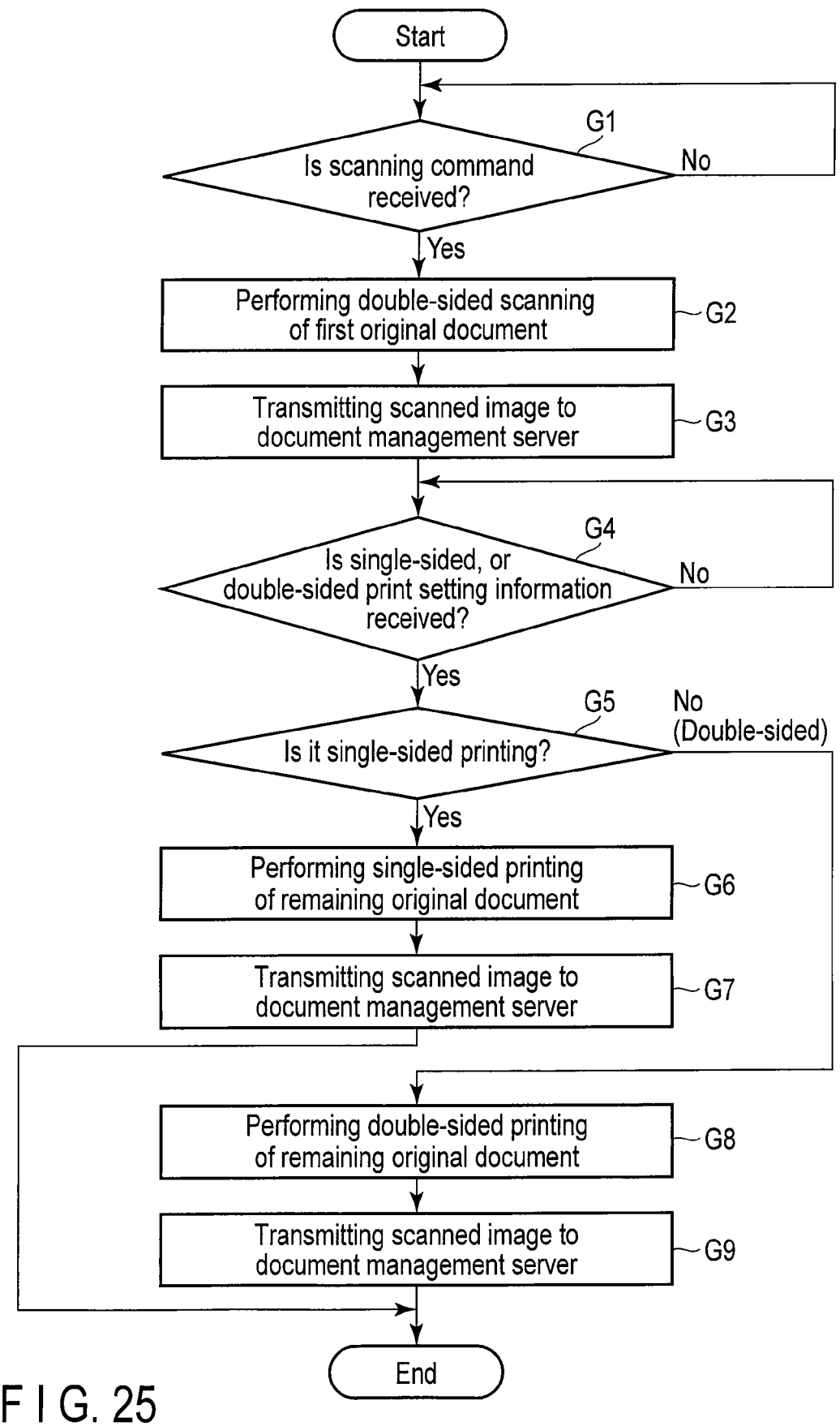
F I G. 25

IMAGE PROCESSING METHOD AND APPARATUS, AND DOCUMENT MANAGEMENT SERVER, PERFORMING CHARACTER RECOGNITION ON A DIFFERENCE IMAGE

CROSS-REFERENCE TO RELATED APPLICATIONS

This application is based upon and claims the benefit of priority from prior Japanese Patent Application No. 2011-061717, filed on Mar. 18, 2011, the entire contents of which are incorporated herein by reference.

FIELD

Embodiments described herein relate generally to an image processing apparatus which digitizes handwritten information which is added to a paper document, a document management server, and a method of image processing.

BACKGROUND

There is a case where an electronic document which is created using a document creating application is printed on a paper, and content of the document printed on the paper is reviewed (check or correct of the described content). At this time, there is a case where handwritten comments and so on are described on the paper document. The handwritten comments may be recorded as minutes by being digitized after the review.

In order to digitize comments which are handwritten on the paper document, it is necessary to make two images correspond to each other to compare an image of the paper document on which the original electronic document is printed (printed image) to an image of the paper document on which comments are added. To do so, a code including an ID which uniquely represents the electronic document is printed when the original electronic document is printed as a paper document. Then, after adding handwritten comments on the printed paper document, the printed original electronic document and a scanned document are related, by extracting the ID by reading the code when scanning the paper document.

In addition, there is a method in which post-processing with respect to handwritten characters which are obtained after scanning is automatically performed, by being included information about the post-processing, for example, extracting or printing a difference image such as the handwritten comments, by comparing the print image to the read image which is obtained by scanning the paper document.

In this manner, in the related art, it was possible to make the original electronic document (printed image) correspond to the image on the paper document, on the basis of the code which is printed on the paper document.

BRIEF DESCRIPTION OF THE DRAWINGS

FIG. 1 is a block diagram which shows a structure of an image processing system in an embodiment.

FIG. 2 is a block diagram which shows a structure of an MFP in the embodiment.

FIG. 3 is a block diagram which shows a structure of a document management server in the embodiment.

FIG. 4 is a block diagram which shows a structure of a client PC in the embodiment.

FIG. 7 is a flowchart which shows processing of the MFP (print processing) in the embodiment.

FIG. 8 is a diagram which shows an example of a print setting screen which is displayed by a display unit of the client PC in the embodiment.

FIG. 14 is a diagram which shows an example of a horizontally long margin which is calculated on the basis of print setting information in the embodiment.

FIG. 15 is a diagram which shows an example of a vertically long margin which is calculated on the basis of print setting information in the embodiment.

FIGS. 23A and 23B are diagrams which show forms in which the comments which correspond to each page are inserted into respective pages in a document which is printed in the embodiment.

FIGS. 24A and 24B are diagrams which show forms in which data of character strings which is obtained from character recognition processing for handwritten comments, and a difference image of the comments are described in each page of a document in the embodiment.

FIG. 25 is a flowchart which shows processing of the MFP (scan processing) in the embodiment.

DETAILED DESCRIPTION

Figure 5:
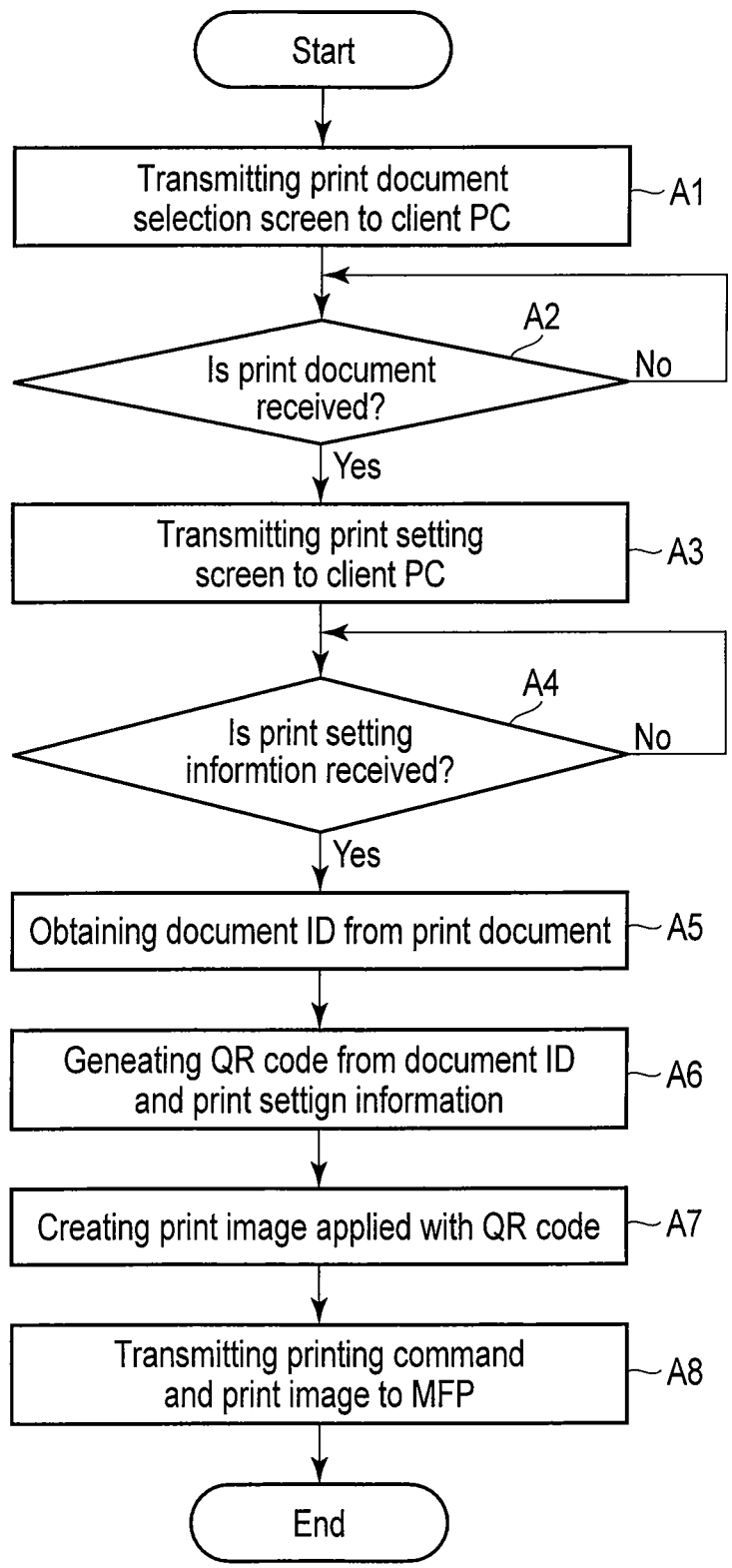
FIG. 5 is a flowchart which shows processing of the document management server in the embodiment.

In general, according to one embodiment, an image processing apparatus comprises a printing control unit, an image reading unit, an extracting unit, a difference image extracting unit, and a determination unit. The printing control unit is configured to control printing of a plurality of pages on one sheet of paper according to a print setting information which indicates a printing form, and printing of a code indicating the print setting information on the paper. The image reading unit is configured to read the paper. The extracting unit is configured to extract the code from the read image. The difference image extracting unit is configured to generate a print image including a plurality of pages based on the print setting information which the code indicates, and to extract the difference image between the printed image and the read image. The determination unit is configured to determine a correlation between the difference image and pages included in the printed image.

FIG. 1 is a block diagram which shows a structure of an image processing system in an embodiment. The image processing system includes an MFP (Multi Function Peripheral) 101, a document management server 102 which performs image processing after obtaining an image from the MFP 101, and a client personal computer (PC) 103 which receives an input from an operator. In addition, the image processing system includes a network 104, which is able to transmit and receive data by being connected to the MFP 101, the document management server 102, and the client PC 103. The network 104 is the Internet, or a LAN (Local Area Network).

As shown in FIG. 2, the MFP 101 includes a CPU (Central Processing Unit) 201 which controls and operates data, a RAM (Random Access Memory) 202 which temporarily stores data for being processed by the CPU 201, a ROM (Read Only Memory) 203 which stores processing programs, and a network Interface (I/F) 204 which inputs or outputs data through the network 104. In addition, the MFP 101 provides an image reading unit 205, a printing unit 206, a FAX unit 207, and provides scan, print, and a FAX function under the control of the CPU 201. The MFP 101 is able to print a document which is recorded in the MFP 101 according to an instruction from the client PC 103, using the print function. In addition, the MFP 101 is able to scan a paper on which a document is recorded using the scan function, read image data (read image), and output the image data to the document management server 102.

As shown in FIG. 3, the document management server 102 includes the CPU 301 which controls and operates data, the RAM 302 which temporarily stores data to be processed by the CPU 301, the ROM 303 which stores a processing program, and a hard disk control unit 304 which controls read and write of data to a hard disk (HD) which stores a processing program or image data, or files such as a document which is created using a document creation application in the client PC 103, and a network interface (I/F) 305 which inputs or outputs data through the network 104. The CPU 301 executes a control of printing performed by the MFP 101, or various image processing to the image data (read image) which is input from the MFP 101 through the network 104, and further, editing processing (creating minutes) of a document file, by executing the image processing program which is recorded in the ROM 303, or the hard disk.

As shown in FIG. 4, the client PC 103 includes a CPU 401 which controls and operates data, a RAM 402 which temporarily stores data to be processed by the CPU 401, a ROM 403 which stores a processing program, a hard disk control unit 404 which controls read and write of data to a hard disk (HD) for storing a program, data, for a long time, and a CD-ROM control unit 405 which controls the read from the CD-ROM which stores a program and so on. Further, the client PC 103 includes an input control unit 406 which controls an input device 410 such as a keyboard, or a mouse, a display unit control unit 408 which controls a display unit 407 which displays information (including print document selection screen, and so on) from the document management server 102, and a network interface (I/F) 409 which inputs or outputs data through the network 104.

According to the embodiment, the document management server 102 operates as the image processing apparatus by executing the image processing program in the CPU 301. In addition, it is possible for the MFP 101 and the document management server 102 to realize the image processing apparatus in cooperation. Further, it is possible the MFP 101 to operate as the image processing apparatus when the MFP 101 executes processing to be executed by the document management server 102 which will be described later.

Figure 6:
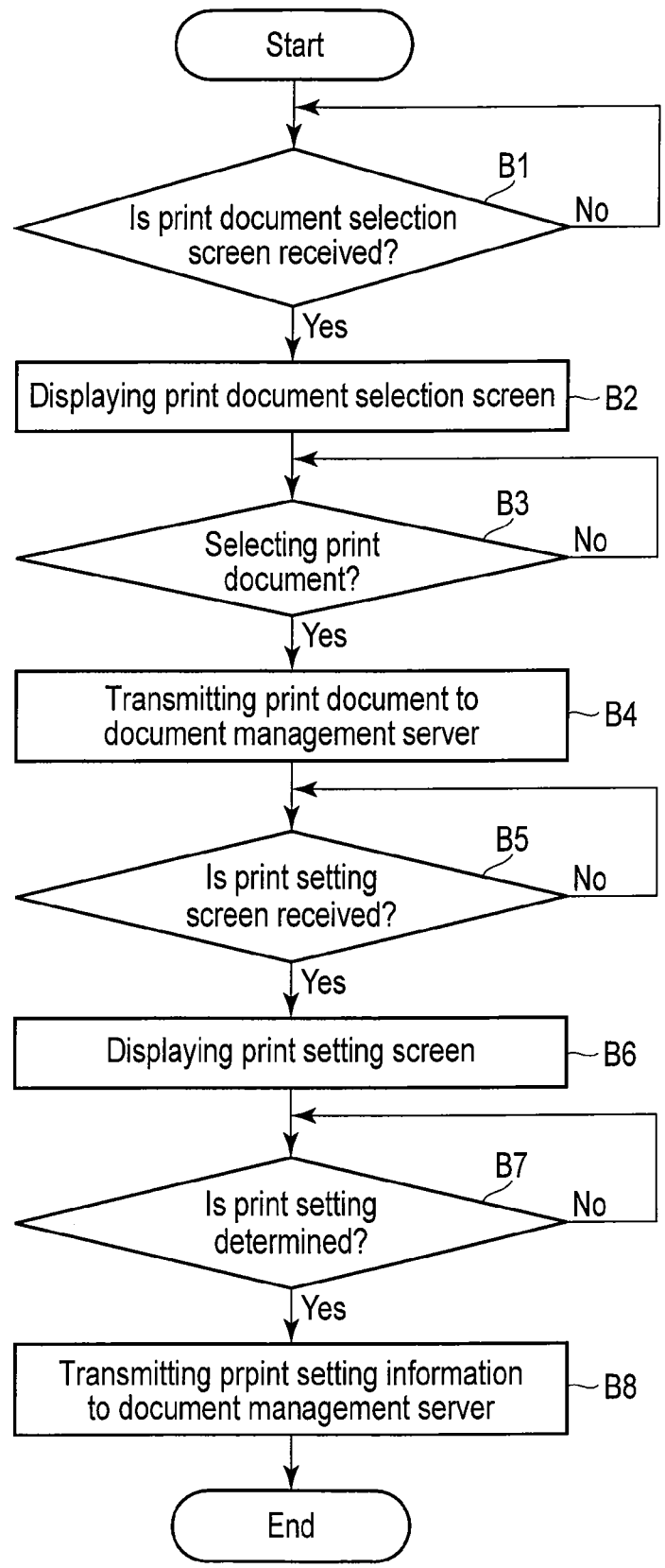
FIG. 6 is a flowchart which shows processing of the client PC in the embodiment.
Figures 9A, 9B, 9C, 9D:
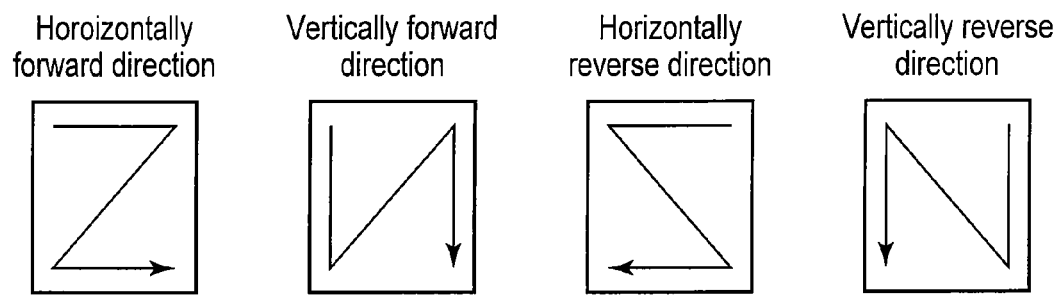
FIGS. 9A, 9B, 9C, and 9D are diagrams which describe set content of printing direction items in the embodiment.

Subsequently, printing processing of a document in the image processing system will be described with reference to flowcharts shown in FIGS. 5, 6, and 7. FIG. 5 is a flowchart which shows processing of the document management server 102, FIG. 6 is a flowchart which shows processing of the client PC 103, and FIG. 7 is a flowchart which shows processing of the MFP 101 (print processing), respectively.

First, the document management server 102 transmits information on a print document selection screen for selecting a document which is printed to the client PC 103 when being connected to the MFP 101 and the client PC 103 through the network 104 (FIG. 5, Act A1). The information on the print document selection screen includes, for example, data for displaying a list of file names of a document which is stored in the document management server 102.

The client PC 103, on connecting with the document management server 102, is waiting for the information on the print document selection screen from the document management server 102. When detecting that the information on the print document selection screen is received (FIG. 6, Yes in Act B1), the client PC 103 displays the print document selection screen on the display unit 407 on the basis of the information on the print document selection screen (Act B2).

When detecting an instruction of selecting a document to be printed from the print document selection screen (Yes in Act B3), the client PC 103 transmits data which shows the selected print document to the document management server 102 (Act B4).

When receiving the print document from the client PC 103 (Yes in Act A2), the document management server 102 transmits print setting screen information for performing print setting to the client PC 103 (Act A3).

When detecting that the print setting screen information is received (Yes in Act B5), the client PC 103 displays the print setting screen on the display unit 407 on the basis of the print setting screen information (Act B6).

FIG. 8 shows an example of the print setting screen which is displayed by the display unit 407 of the client PC 103.

The print setting screen provides with a plurality of print setting items for setting a print form when printing a document on a paper. In the print setting items, for example, there are an N-in-1 setting item 1001 for setting the N-in-1 print in which a plurality of pages (N pages) is printed together on one sheet, a print duplex setting item 1002 for setting either double-sided printing or single-sided printing, a printing direction item 1003 for setting an arrangement of pages when a plurality of pages are printed on one paper, and a color mode setting item 1004 for setting a color mode when printing a document.

In the N-in-1 setting item 1001, it is possible to set either number of pages (for example, 2, 4, 6, 8, 9, and 12) to be printed on one sheet (one surface), in addition to "non N-in-1 printing".

In the print duplex setting item 1002, it is possible to set whether to perform printing on the "single side", or the "double side" to one sheet of paper. In addition, when performing the double-sided printing, it is possible to set whether to print in the horizontal long direction of the paper (closing short side), or print in the vertically long direction of the paper (closing long side).

As shown in FIGS. 9A, 9B, 9C, and 9D, as the arrangement of the pages, it is possible to set any one of "horizontally forward direction" (FIG. 9A), "vertically forward direction" (FIG. 9B), "horizontally reverse direction" (FIG. 9C), and "vertically reverse direction" (FIG. 9D) in the printing direction item 1003.

In the color mode setting item 1004, it is possible to set any one of "full color", "gray scale", and "monochrome", as the color mode.

When the setting is completed by an instruction to a "decision" button, after setting (selecting) each of the print setting items 1001 to 1004 (Yes in Act B7), the client PC 103 transmits the print setting information which shows the set content to the document management server 102 (Act B8).

When the print setting information is received from the client PC 103 (Yes in Act A4), the document management server 102 obtains a document ID which is predetermined to the print document (Act A5). In addition, the document ID is unique date for the document which is predetermined to each document stored in the document management server 102.

The document management server 102 generates a code pattern including the document ID and the print setting information which is received from the client PC 103 (Act A6). The code pattern is printed together with a document on a paper on which the document is printed, and in which, for example, a two-dimensional code is used. Hereinafter, the code pattern will be described as QR (Quick Response) code. In addition, a two-dimensional code other than the QR code may be used, and it is also possible to use a one-dimensional code such as a bar code, or a three-dimensional code.

Subsequently, the document management server 102 creates a print image corresponding to a print document according to the print setting information in order to be printed by the MFP 101 (Act A7). That is, in the print setting screen shown in FIG. 8, a print image corresponding to the set content is created, which is set in the N-in-1 setting item 1001, the print duplex setting item 1002, the printing direction item 1003, and the color mode setting item 1004, respectively.

For example, when "4-in-1" is set in the N-in-1 printing, a print image is created in which four pages are printed in one sheet. In addition, when "double side (closing short side)" is set, respective print images for the front surface, and the rear surface of the paper are created by laying out the page to be printed in landscape direction of the paper. When the "horizontally forward direction" is set as the printing direction when printing a plurality of pages in one sheet, each page is arranged in the order shown in FIG. 9A. In addition, when the "gray scale" is set as the color mode, and when color characters or figures, a color picture or the like other than black characters are included in the document, a print image in which the color characters or figures, or the color picture are expressed in gray scale is created.

In addition, the document management server 102 applies a printing pattern of a QR code including the print setting information and the document ID to the print image. In the embodiment, one QR code is applied to a predetermined position on the paper, for example, in the vicinity of the upper left corner of the paper.

In addition, when the N-in-1 printing is set in the print setting information, a plurality of pages of the print document are included in the print image which is printed on one sheet of paper. One QR code is applied to the print image including the plurality of pages.

Further, the print image of the QR code is set to be generated so that the QR code is printed on one surface (for example, on the front surface) of at least the first paper. When the print document is printed on the plurality of paper, it is possible to print the QR code only on the first sheet, or on each of all the paper, respectively. In addition, when the "double-sided" printing is set in the print setting information, it is possible to print the QR code only on one side surface, or on both side surfaces. When the QR code is printed only on the first sheet, the process is simple, since the QR code created at one time.

The document management server 102 transmits print command which instructs an execution of printing, and the print image to the MFP 101 (Act A8).

When receiving the printing command and the print image from the document management server 102 (FIG. 7, Yes in Act C1), the MFP 101 prints using the printing unit 206 (Act A2). In the print document which is printed by the MFP 101, the document is printed according to a form which is designated by the print setting information, and is printed with a QR code including the print setting information in the vicinity of the upper left corner.

The print document is used, for example, when performing a review (check, correct, of the described content) regarding the content of the document. Here, a comment formed of character strings and so on showing the corrected content is written using handwriting.

Figure 10:
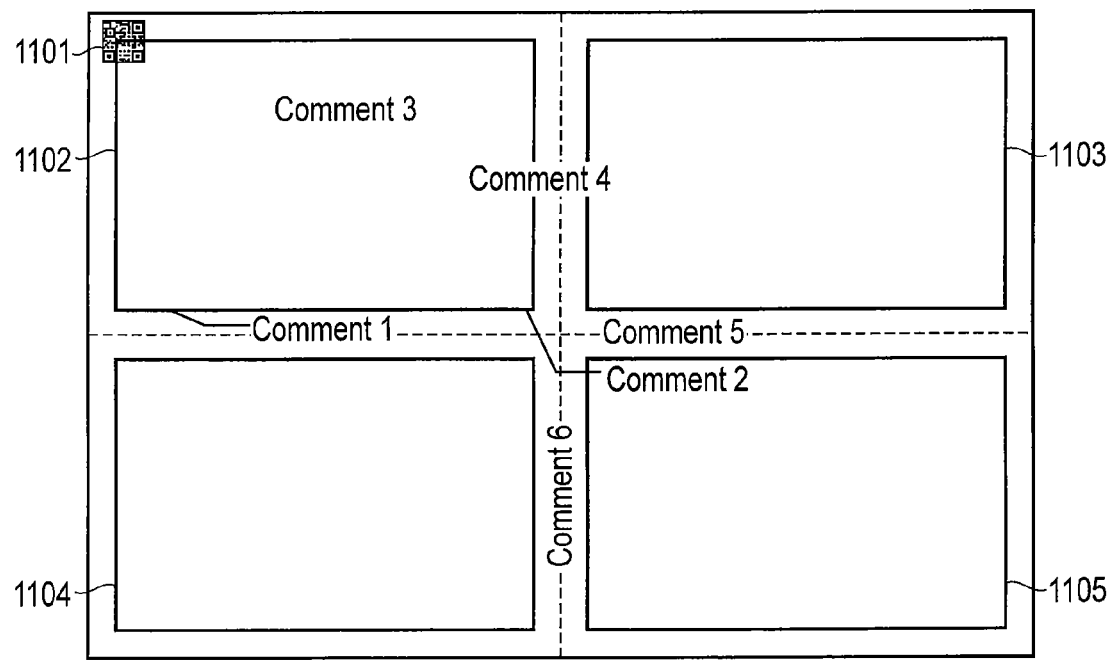
FIG. 10 is a diagram which shows an example of a printed document on which comments are handwritten in the embodiment.

FIG. 10 shows an example of a print document of which the comment is handwritten. The print document in FIG. 10 shows an example in which, for example, "4-in-1" is set in the N-in-1 setting item 1001, "single side" is set in the print duplex setting item 1002, "horizontally forward direction" is set in the printing direction item 1003, and "monochrome" is set in the color mode setting item 1004.

As shown in FIG. 10, the QR code 1101 is printed in the vicinity of the upper left corner of the print document. In addition, according to the print setting information, four pages of documents are printed on one sheet of the paper (on one surface). Rectangular frames 1102, 1103, 1104, and 1105 shown in FIG. 10 indicate contents of each page in the print document, for example, a range in which character strings are printed. The contents of the print document (character strings) are omitted in FIG. 10 in order to make a description position of the handwritten comment be easily recognized. In addition, dashed lines in FIG. 10 indicate the boundary of each page, and are not printed.

In FIG. 10, the handwritten contents are indicated by "comment 1" to "comment 6" so as to be easily recognized, however, in practice, meaningful contents such as character strings, pictures, figures, or the like which indicate the corrected content as a result of the review are handwritten as comments.

In the image processing system according to the embodiment, there is no limit in the description position when handwriting the comment to the print document. In general, the handwriting is usually performed in a space between lines, or in a margin which is provided around the printed page.

For example, the "comment 2", "comment 3", and "comment 4" show examples in which the handwriting is performed in a space between lines, and the "comment 1", "comment 5", and "comment 6" show examples in which the handwriting is performed in the margin. In addition, it is possible to perform the handwriting on the print document overlapped.

In addition, in the "comment 1" and "comment 2", a pattern of a predetermined form for clarifying the correlation with the page is handwritten, in addition to the comment. In the example shown in FIG. 10, a pointing line for pointing the corresponding page to the handwritten comment is handwritten. The pointing line is handwritten with a predetermined length or more (the length which is sufficiently longer than a line when a usual character is handwritten) so that one end thereof is in the vicinity of the comment, and the other end is in the region of the page corresponding to the comment. Since the pointing line is a simple line, it is possible to reduce the burden in handwriting. In addition, it is possible to use other shapes of patterns, however, since the handwriting is needed in addition to the comment, it is desirable to use a simple pattern in order not to increase the burden.

According to the embodiment, it is possible to determine to which page the comment corresponds on the basis of the position of the handwritten comment, and the printing position of each page of the print image, by the image processing in the document management server 102. The detailed image processing for making the page be correlated with the comment will be described later.

Figure 11:
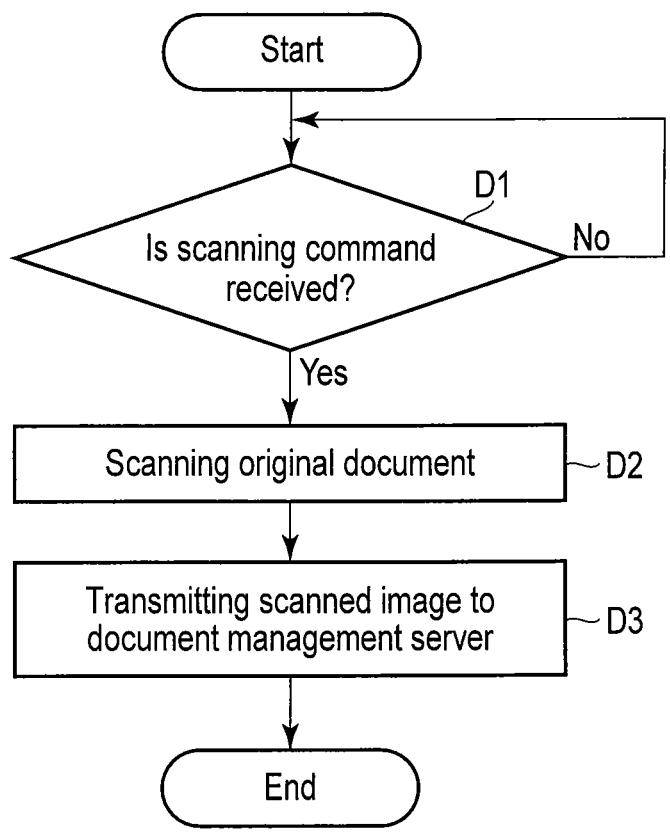
FIG. 11 is a flowchart which shows processing of the MFP (scan processing) in the embodiment.
Figure 12:
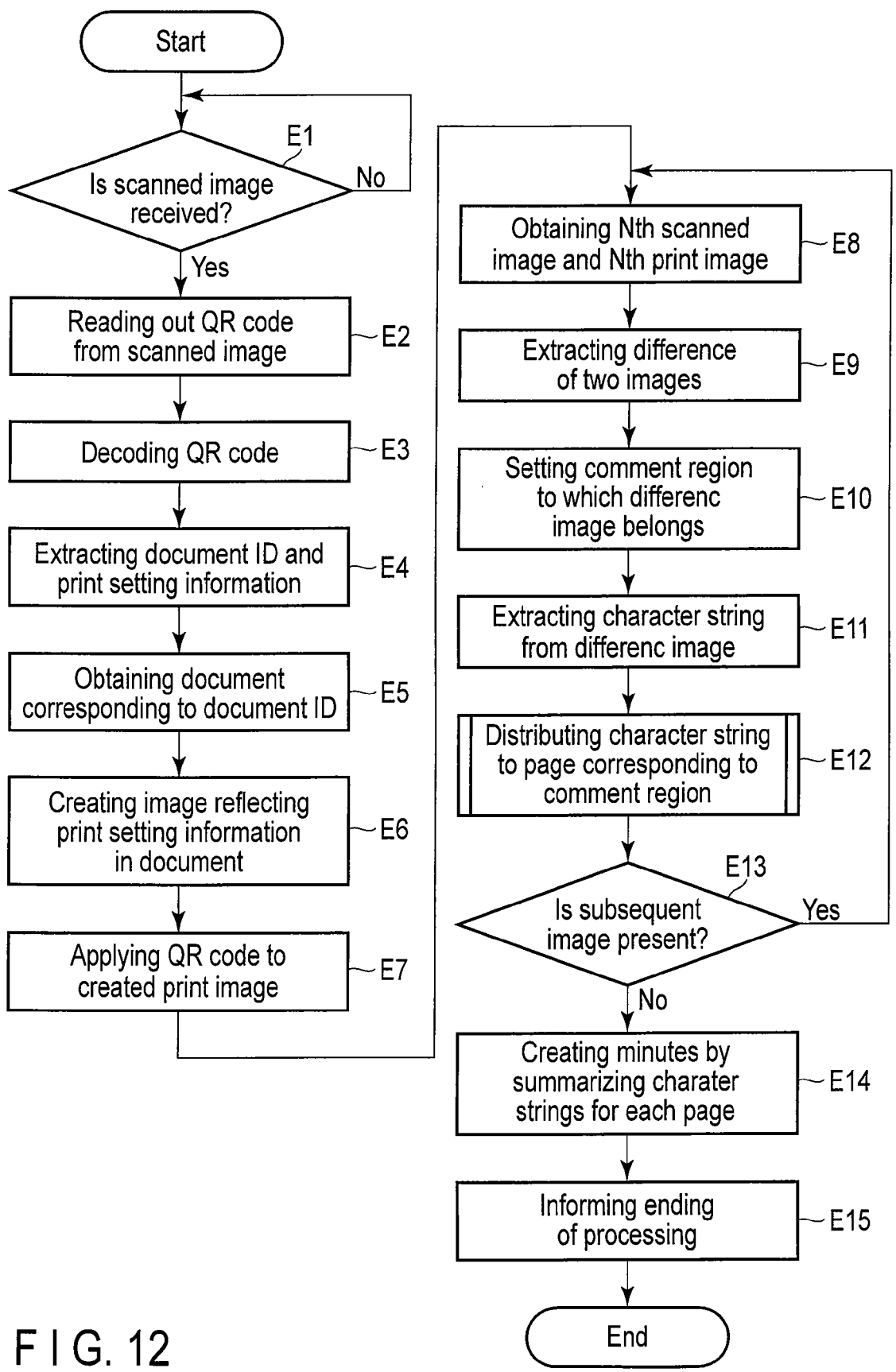
FIG. 12 is a flowchart which shows processing of the document management server in the embodiment.

Subsequently, processing for creating minutes in which the handwritten comment in the print document is summarized for each page will be described with reference to flowcharts shown in FIGS. 11 and 12. FIG. 11 is a flowchart which shows the processing of the MFP 101 (scanning processing), and FIG. 12 is a flowchart which shows the processing of the management server 102, respectively.

When receiving a scanning command (FIG. 11, Yes in Act D1), first, the MFP 101 scans the original document (print document) using the image reading unit 205, and reads out image data (read image) (Act D2). Here, the MFP 101 is to execute scanning of the original document using an ADF (Auto Document Feeder). That is, the scanning is performed in a lump with respect to the original document which is set in the ADF. When a plurality of original documents is set, a scanned image with respect to the plurality of original documents is read out.

Here, it is assumed that, for example, a single side is printed with respect to the plurality of original documents (print document), and only the first document is printed with the QR code. In this case, it is assumed that the plurality of original documents is aligned in the right direction, and in the right order, is set in the ADF, and is scanned.

The MFP 101 transmits the read image to the document management server 102 when the scanning with respect to all of the original documents which are set in the ADF is finished (Act D3).

When the read image is received from the MFP 101 (FIG. 12, Yes in Act E1), the document management server 102 reads out the QR code from the read image which is read out from the first original document (Act E2). The QR code is easily read out, since the QR code is printed at a predetermined position of the original document (in the vicinity of the upper left corner).

The document management server 102 by decodes the QR code which is read out from the read image (Act E3), and extracts the print setting information and the document ID which are included in the QR code (Act E4).

The document management server 102 obtains a document corresponding to the document ID from a plurality of documents which is stored (Act E5), and creates an image that reflects the print setting information, that is, the equal image to the print image (Act E6). That is, an image corresponding to the set contents regarding the N-in-1 printing, the printing surface, the printing direction, and the color mode is generated, in the same manner as when performing printing.

In addition, the document management server 102 generates the QR code (code pattern) including the document ID and the print setting information, and applies the QR code to the print image (Act E7). In this manner, it is possible to generate the same print image as that generated at the time of printing the original print document. Further, when the print document has the length (the number of pages) which can't be printed in one sheet of the paper, print images for a plurality of documents are generated.

Subsequently, the document management server 102 executes following processing in order from the first with respect to the read image received from the MFP 101. The document management server 102 obtains the Nth (initial value N=1) read image, and the Nth print image (Act E8), and extract a difference of the two images (Act E9). Hereinafter, the image extracted here is referred to as a difference image. Since the print image which is generated on the basis of the document ID extracted from the read image, and the print setting information is the same image as the print image which is obtained when printing the print image as the base of the read image, only the comment which is handwritten with respect to the print document is extracted as the difference image by extracting the difference in two images.

Figure 13:
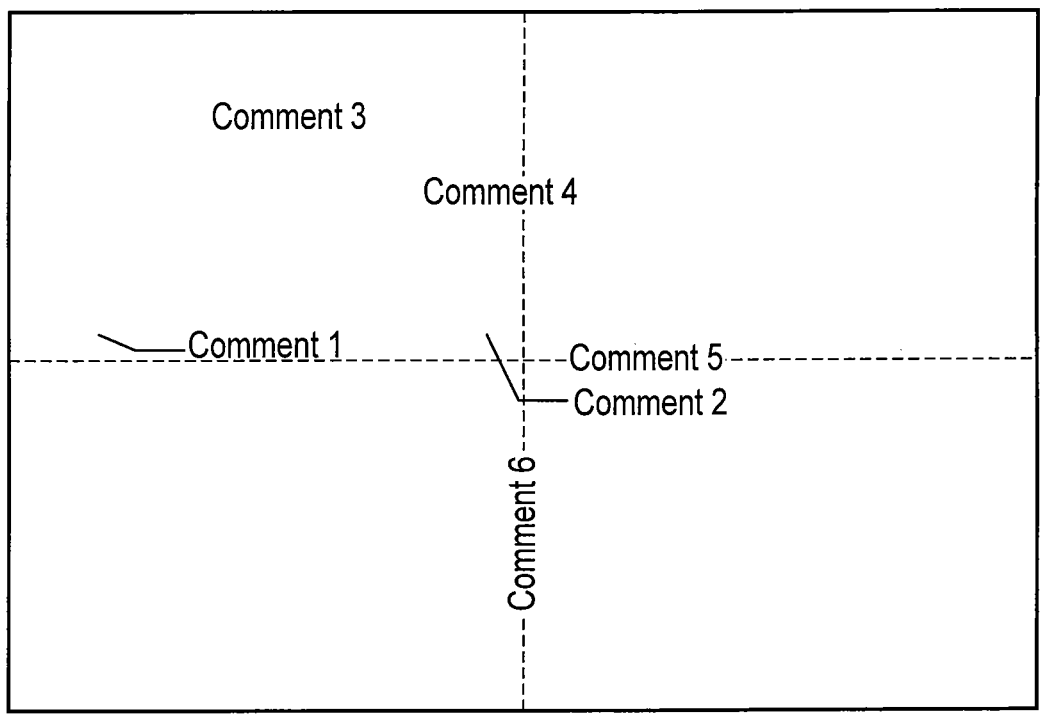
FIG. 13 is a diagram which shows an example of a difference image in the embodiment.

FIG. 13 shows an example of the difference image. The difference image shown in FIG. 13 corresponds to the print document in which comments shown in FIG. 10 are handwritten, in which respective "comment 1" to "comment 6" are extracted. In addition, a pattern (pointing line) of a shape which is predetermined in order to clarify the correlation with the page is added to the "comment 1" and "comment 2. Further, the dashed line in FIG. 13 indicates the boundary of each page, and is not included in the difference image.

Subsequently, the document management server 102 classifies the difference image for each comment which is handwritten, by determining a unity (group) of the difference image. The unity (group) of the difference image is, for example, set as a group of images in which images adjacent to each other are present in a predetermined distance. The document management server 102 sets a region which shows a handwritten range (hereinafter, referred to as a comment region), and records with respect to the difference image which is classified for each comment.

For example, the comment region is set by a rectangle which circumscribes the difference image. The range of the comment region is that which defines the XY coordinate system with respect to the read image, and is indicated by the coordinate value of two diagonal vertices of a rectangle (for example, upper left and lower right).

In addition, when the pointing line is added to the comment, a comment region is set with a group of difference images in which a difference image corresponding to the pointing line is excluded as a target. The difference image by the pointing line is a line with the predetermined length or more, and is easily distinguished from the difference image denoting characters. When the difference image corresponding to the pointing line is extracted, a coordination value of both ends of the difference image (a point in the vicinity of the comment region is set to a starting end, and the other point is set to a terminal) is also recorded along with the coordination value of the comment region.

In addition, as shown in FIG. 10, the comment with respect to the print document is handwritten not only in the horizontal, or vertical directions, but also in an oblique direction. In this case, the comment region is indicated not only by the coordination value of the two diagonal vertices of a rectangle, but may be set by other definition methods. Further, it is also possible to set the comment region corresponding to character strings using a group of a plurality of rectangle frames, by setting a rectangle frame for each difference image of one character.

Subsequently, the document management server 102 extracts character strings which are indicated by the difference image, by performing character recognition processing with respect to the difference image (Act E11).

The document management server 102 classifies the difference image which is classified for each comment into each image corresponding to one character by using a known character recognition technology. In addition, the handwritten character is determined by collating each image corresponding to one character with dictionary data for character recognition which is prepared in advance, and character data of the character is recorded.

In addition, in the character recognition processing, it is possible to improve the recognition rate using the position of the comment region which is set in the print setting information and the read image. That is, the positional relationship between the margin and the comment region (difference image) in the print image is determined, the direction of the character string is set on the basis of the positional relationship, and the character recognition is performed.

For example, the document management server 102 is able to calculate the range of the margin which is provided at the periphery of the page to be printed on the basis of the print setting information. FIG. 14 shows the horizontal margins 1401, 1402, and 1403 which are calculated on the basis of the print setting information, and FIG. 15 shows the vertical margins 1501, 1502, and 1503, in the same manner.

FIG. 14 shows an example in which a comment is handwritten in the horizontal margin 1401. The comment region of the comment A shown in FIG. 14 is set by two points coordinates P1 and P2. The document management server 102 determines that the comment A is horizontally written when it is determined that the two points coordinates P1 and P2 are included in the horizontal margin 1401. In this case, when the character recognition processing is performed with respect to the difference image, the processing is performed assuming that the character is horizontally handwritten.

In the same manner, the comment region of the comment B shown in FIG. 15 is set by two points coordinates P3 and P4. The document management server 102 determines that the comment B is vertically written when it is determined that the two points coordinates P3 and P4 are included in the vertical margin 1501. In this case, when the character recognition processing is performed with respect to the difference image, the processing is performed assuming that the character is vertically handwritten.

In this manner, it is possible to expect the improvement of the recognition rate of the character, by determining the positional relationship between the margin and the comment region which is calculated using the print setting information, and executing the character recognition processing with respect to the difference image by setting the direction of the character string which is handwritten on the basis of the positional relationship.

In addition, FIGS. 14 and 15 show cases where the two points coordinates which indicate the comment region are in the margin, however, it is also possible to determine whether the handwriting is performed horizontally, or vertically, on the basis of other positional relationships. For example, when one point which indicates the position of the comment region is included in the horizontal margin, and the other point is in the vicinity of the horizontal margin, it may be determined as the horizontal writing (the same is applied to the vertical margin, as well). Further, it is also possible to determine the direction of the handwritten character string, and reflect the determination in the character recognition processing, using a different method on the basis of the positional relationship between the margin and the comment region (difference image).

In addition, when the character direction (horizontal writing and vertical writing) of a document is included in the print setting information, it is possible to execute the character recognition processing according to the setting of the character direction. In general, usually, the character string of the comment is handwritten horizontally along the alignment of the document. For this reason, when the character direction of the document is set to "horizontal writing", it is possible to expect the improvement of the recognition rate of the character, by executing the character recognition processing with respect to the difference image by setting the direction of the handwritten character string to the "horizontal writing".

As described above, the document management server 102 executes the character recognition processing with respect to each of the difference images which is classified for each comment, and records the result of character recognition processing (character string, or the like) of each comment.

In addition, it is also possible to record the difference image as images such as a figure, a picture, or the like, not only recognizing all of the difference images as the characters. For example, when the recognition rate is lower than the reference value which is set in advance when being collated with the dictionary data, in the character recognition processing with respect to the difference image, it is assumed that the handwritten comment is the figure, the picture, or the like other than the characters, and the difference image is recorded as the handwritten comment as is.

In addition, even when the difference image is recognized as the characters as a result of the character recognition processing (when the recognition rate is the reference value or more), it is possible to make the difference image being recorded along with the character recognition result (character data) by being correlated with each other.

Subsequently, the document management server 102 determines to what page the comment region (difference image) corresponds, and allocates the result of the character recognition processing (character string, or the like) of each comment, to the corresponding page (Act E12). That is, the document management server 102 determines that for what page the comment (character string, or the like) is handwritten, on the basis of the correlation between the difference image and the page included in the print image.

Figure 16:
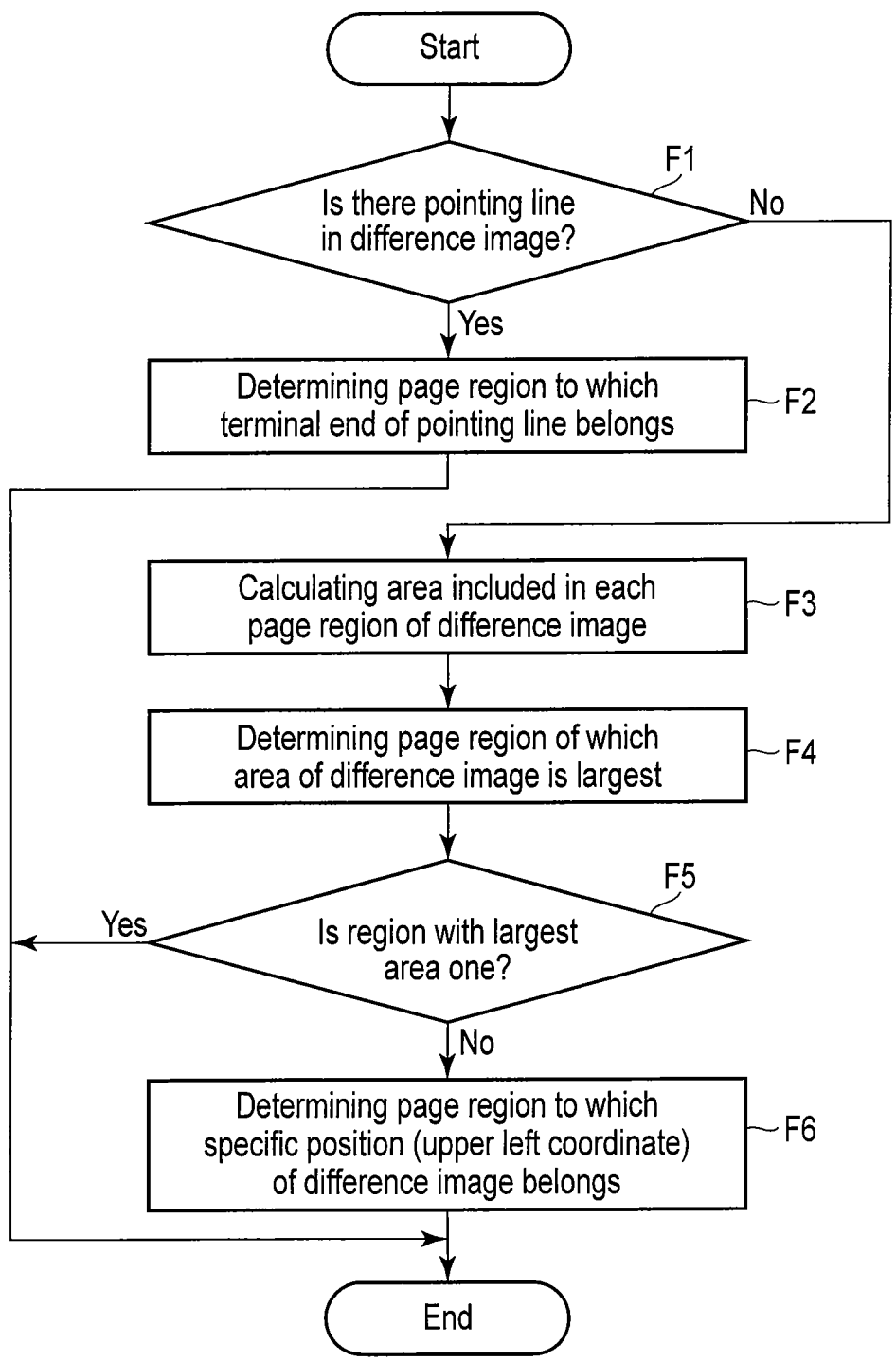
FIG. 16 is a flowchart which shows processing for determining a correlation between comments area (difference image) and pages in the printed image in the embodiment.

FIG. 16 is a flowchart which shows processing for determining the correlation between the comment region (difference image) and the page in the print image. The document management server 102 executes the processing shown in FIG. 16 with respect to each comment region, and determines pages corresponding respectively thereto.

When the pointing line is added to the difference image (comment region) (Yes in Act F1), the document management server 102 determines a page to which the terminal coordinate of the pointing line belongs as a target to correspond (Act F2).

Figure 17:
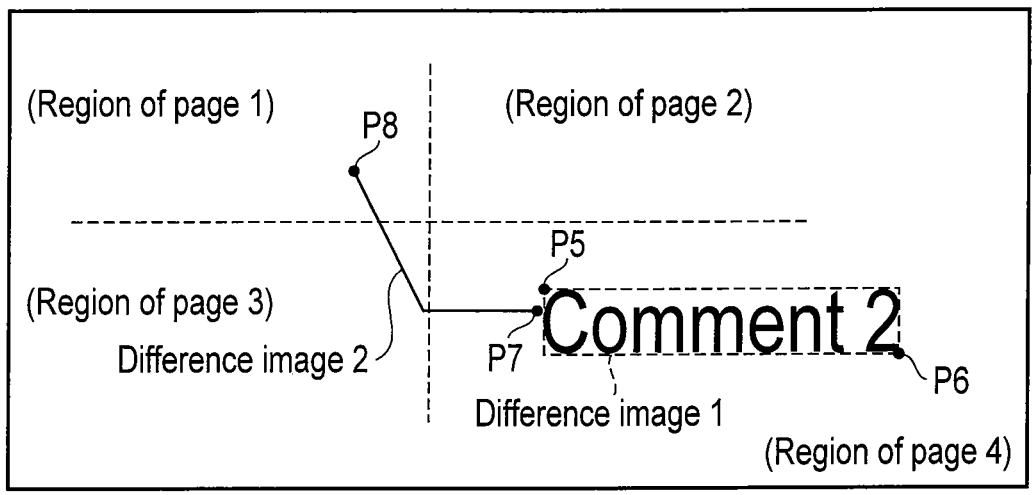
FIG. 17 is a diagram which shows a difference image of "comment 2" to which a pointing line shown in FIG. 13 is added in the embodiment.

FIG. 17 shows the difference image of the "comment 2" to which the pointing line shown in FIG. 13 is added. As shown in FIG. 17, the comment region is set with respect to the difference image 1 of the "comment 2" using two points coordinates P5 and P6. A pointing line (difference image 2) of which the starting end is P7, and the terminal is P8 is added to the comment region.

The document management server 102 is able to determine the respective printing positions of the plurality of pages in the read image, on the basis of the print setting information. In FIG. 17, the regions of the first to fourth pages are determined as positions at which the respective first to fourth pages are printed. Accordingly, the document management server 102 is able to determine that the coordinate of the terminal P8 of the pointing line is included in the region of the first page.

The pointing line is an intentionally added, and predetermined pattern in order to clarify a page to correspond to the comment 2, when the comment 2 is handwritten. Accordingly, even though the comment 2 is handwritten in the region of the fourth page, the comment 2 is determined as a comment to correspond to the first page.

Subsequently, when the pointing line is not added to the difference image (comment region) (No in Act F1), the document management server 102 calculates the area to be included in the region of each page of the difference image (comment region) (Act F3), and determines a region of the page of which the area in which the difference image is included is the largest as a target to correspond (Act F4).

Figure 18:
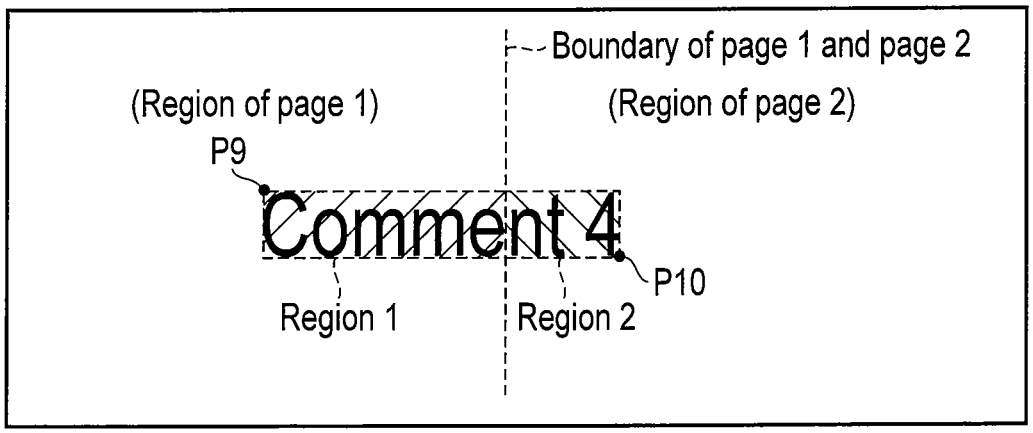
FIG. 18 is a diagram which shows a difference image of "comment 4" shown in FIG. 13 in the embodiment.

FIG. 18 shows a difference image of the "comment 4" shown in FIG. 13. As shown in FIG. 18, the comment region of the difference image of the "comment 4" is set by two points coordinates P9 and P10. The comment region is included in the regions of the first and second pages.

The document management server 102 is able to determine the boundary of the regions of the first and second pages on the basis of the print setting information. The document management server 102 calculates respective areas of the "region 1" which is included in the first page, and the "region 2" which is included in the second page, and determines which area is large between the two regions, on the basis of the coordinates P9 and P10, and the boundary between the regions of the first and second pages. In addition, the comment region shown in FIG. 18 is include in two pages regions, however, when the comment region is included in the regions of three or more pages, the areas respectively included in the regions of three or more pages are calculated and compared.

Here, when there is only one region of the page of which the area is the largest, (Yes in Act F5), the document management server 102 causes a comment to correspond to the page of which the area in which the comment region is included is the largest. The comment 4 shown in FIG. 18 has the larger area in the "region 1" included in the first page than in the "region 2", the comment 4 is determined to correspond to the first page.

Usually, when the comment is input by handwriting, there is a tendency to write a comment in the related page, it is possible to determine a page corresponding to the comment, on the basis of the area in which the comment region is included.

In addition, when there are two or more regions of page of which the area is the largest (No in Act F5), the document management server 102 determines a region of the page to which a specified position of the difference image belongs as a target to correspond (Act F6). Here, for example, the specified position of the difference image is set to coordinate of the upper left vertex indicating the position of the comment region.

Figure 19:
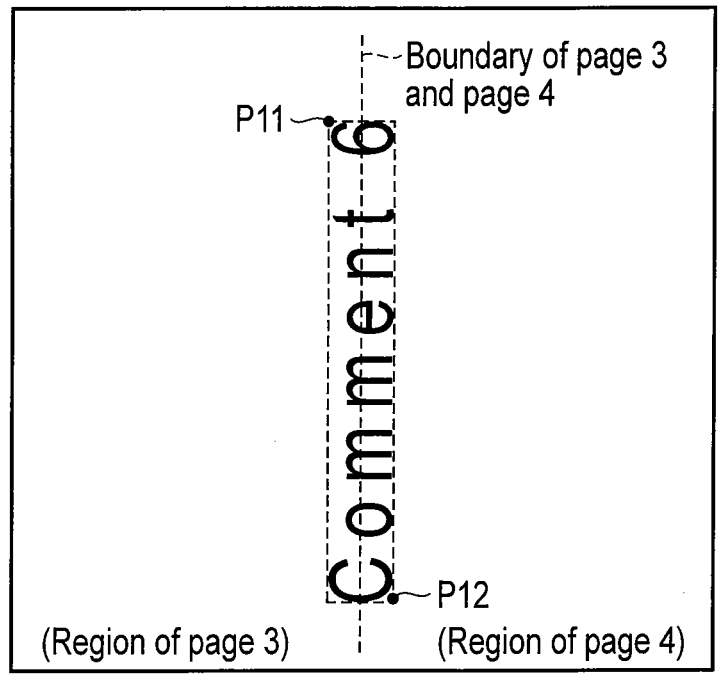
FIG. 19 is a diagram which shows a difference image of "comment 6" shown in FIG. 13 in the embodiment.
Figure 20:
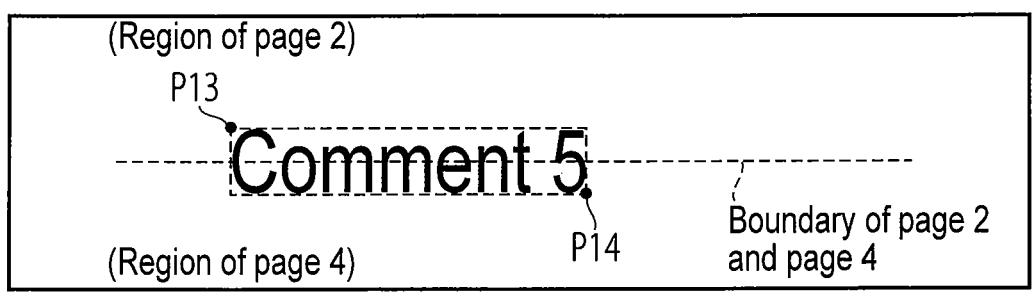
FIG. 20 is a diagram which shows a difference image of "comment 5" shown in FIG. 13 in the embodiment.

FIG. 19 shows the difference image of the "comment 6" shown in FIG. 13, and FIG. 20 shows the difference image of the "comment 5" shown in FIG. 13, respectively.

As shown in FIGS. 19 and 20, the difference images of the "comment 6" and "comment 5" (comment region) are on the boundary of the page, and has the same area included in the region of the page, respectively.

In this case, the document management server 102 determines that the comment 6 corresponds to the third page, since the upper left coordinate P11 is included in the third page with respect to the "comment 6" shown in FIG. 19. In addition, the document management server 102 determines that the comment 5 corresponds to the second page, since the upper left coordinate P13 is included in the second page with respect to the "comment 5" shown in FIG. 20.

In this manner, it is possible to reliably determine a page to correspond to a comment region by ranking the first priority in an order of the pointing line added to a comment, the area in which a comment region is included, and a starting position of writing of a comment (upper left coordinate). Accordingly, it is possible to reduce a limit when handwriting a comment.

In this manner, when processing of all of the comment regions (difference image) is completed with respect to the Nth read image, the document management server 102 repeatedly executes the same processing as the above described processing (Acts E8 to E12), when there is the next read image (Yes in Act E13).

When the processing with respect to all of the read images is completed (No in Act E13), the document management server 102 creates minutes in which a comment (character string or the like) which is recorded by processing with respect to each of the read images is summarized for each page (Act E14).

Figure 21A:
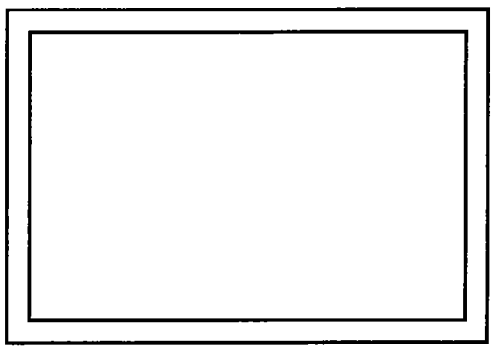
FIGS. 21A, 21B, 21C, and 21D are diagrams which show forms in which comments corresponding to each page are inserted into a document which is printed for each page in the embodiment.
Figure 21B:
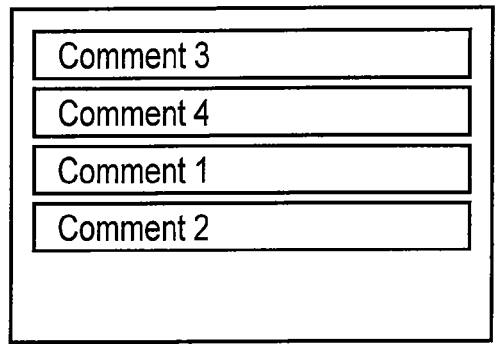
Figure 21C:
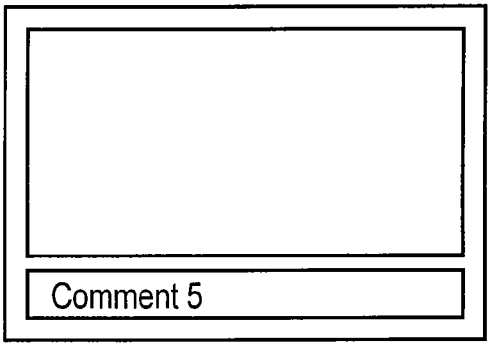
Figure 21D:
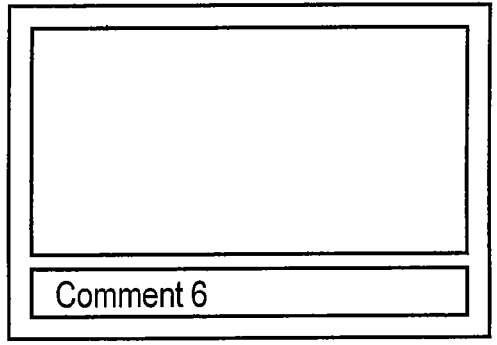

FIGS. 21A, 21B, 21C, 21D, 22, 23A, 23B, 24A, and 24B show examples of forms of the minutes which are created by the document management server 102. FIGS. 21A, 21B, 21C, 21D show forms in which a comment correlated with each page is inserted in each page in a document as a printing target. FIG. 21A is the first page of the document, and "comment 3", "comment 4", "comment 1", and "comment 2" which are correlated with the first page, as shown in FIG. 21B, are inserted on the subsequent page. In addition, the order of the comment is decided according to the arrangement in the difference image. For example, in the example shown in FIG. 21B, the comments are arranged in an order of the comment which is arranged on the upper part of the read image. FIG. 21C shows the second page of the document, and the "comment 5" which is correlated with the second page. FIG. 21D shows the third page of the document, and the "comment 6" which is correlated with the third page.

When the print document is created using a predetermined application for document creation, if a function for adding a comment is provided in the application, it is possible to add the comment as comment data to the original document using this function.

In the forms shown in FIGS. 21A, 21B, 21C, 21D, it is possible to make the comment be correlated with the document body, since the comments are classified by being correlated with each page of the document.

Figure 22:
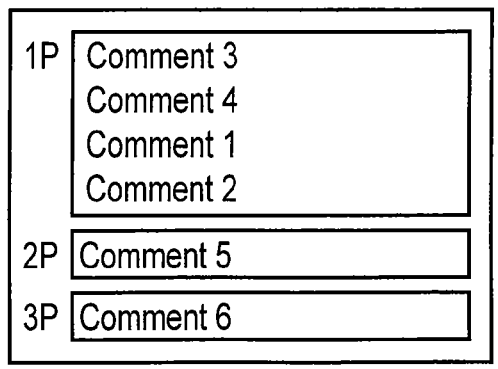
FIG. 22 is a diagram which shows a form in which only the comments are classified by each page in the embodiment.

FIG. 22 shows a form in which only the comments are classified for each page. As shown in FIG. 22, the "comment 3", "comment 4", "comment 1", and "comment 2" correlated with the first page are collectively described, and the "comment 5" and "comment 6" which are correlated with the second and third pages, respectively, are described.

In the form shown in FIG. 22, it is possible to collectively confirm only the comments which are added by handwriting easily.

FIGS. 23A and 23B show forms in which the comments which are correlated with each page are inserted in each page in a document as a printing target. FIGS. 23A and 23B show the first page of the document, and in which the "comment 3", "comment 4", "comment 1", and "comment 2" correlated with the first page are inserted in the page.

When the forms shown in FIGS. 23A and 23B are used, it is possible to determine not only the correlation between the comment region (difference image) and the page, but also the position of the comment region in the page. For example, in FIG. 13, the "comment 3" is present at a position of about ⅓ from the upper end in the page. Similarly, the "comment 4" is present at a position of about ½ from the upper end in the page, and the "comment 1" and "comment 2" are present under the lower end in the page.

In the document management server 102, the comments are inserted in the vicinity of the corresponding row in the page according to the position in the page of each comment region. In FIG. 23A, the "comment 3" is inserted at a row position of about ⅓ from the top of the page, the "comment 4" is inserted at a row position of about ½ from the top of the page, and the "comment 1" and "comment 2" are inserted at the end of the line.

In addition, since the comment with respect to the print document is not handwritten by being strictly aligned to the row position of the document, the position of the comment in the page of each comment region, or the row position at which the comment is inserted is not necessarily exactly calculated.

In addition, when the print document is created using the predetermined document creation application, if a function of adding characters or the like in a document using a display form clarifying a revised portion (revision history display) is included in the application, it is also possible to insert the comment in the original document as comment data using the function.

In the forms shown in FIGS. 23A and 23B, it is possible to make the document body and the comment be correlated with each other easily, since the comment is inserted in the page of the document.

FIGS. 24A and 24B show forms in which the difference images of the comments are described along with the data of the character strings obtained in the character recognition processing with respect to the handwritten comment, for each page of the document.

In the forms shown in FIGS. 24A and 24B, the comments which are read out in each page, and the difference images corresponding respectively thereto are described. In addition, in the examples shown in FIGS. 24A and 24B, the difference images with respect to all of the comments are described, however, it is possible to describe the difference image only for the comment which obtained the low recognition rate by the character recognition processing, for example, and to describe only the difference image with respect to the comment of which the recognition rate was row. In addition, as shown in FIGS. 21A to 21D, or FIGS. 23A and 23B, it is possible to insert the comment (character strings) and the difference image (or any one of the comment and the difference image) in the print document.

In addition, it is possible to arbitrarily set any one of the forms with which the minutes is created among the forms which are shown in FIGS. 21A to 24B in advance with respect to document management server 102 from the client PC 103, and to fix to any one of the forms.

In this manner, the document management server 102 records the data of the minutes, and informs the client PC 103 that the processing is completed, when the minutes in which the comments handwritten in the print document are summarized in each page is created (Act E15).

In this manner, in the system according to the embodiment, it is possible to create the minutes simply, in which the comments are classified for each page, by determining the correlation between the comment handwritten in the print document in which a plurality of pages is printed and each page.

In addition, in the above description, (1) "a case where a plurality of original documents (print documents) is subject to a single-sided printing, and a QR code is printed only on the first original document" is exemplified, however, (2) "a case where the plurality of original documents (print documents) is subject to a double-sided printing, and the QR code is printed only on the first original document", (3) "a case where the plurality of original documents (print documents) is subject to the single-sided printing, and the QR code is printed in all of the documents", and (4) "a case where the plurality of original documents (print documents) is subject to a double-sided printing, and the QR code is printed in all of the documents" are also possible as the target.

It is possible to execute the same processing as that in the above description with respect to the read image which is read out from each surface, by performing the double-sided scanning with respect to the original document (print document) in the scanning processing, and reading out the image data (scanned data), with respect to the (2) "a case where the plurality of original documents (print documents) is subject to the double-sided printing, and the QR code is printed only on the first original document". The document management server 102 reads out the QR code from the read image on the surface of the first original document, and executes processing on the basis of the document ID indicated by the QR code, and the print setting information.

Figure 26:
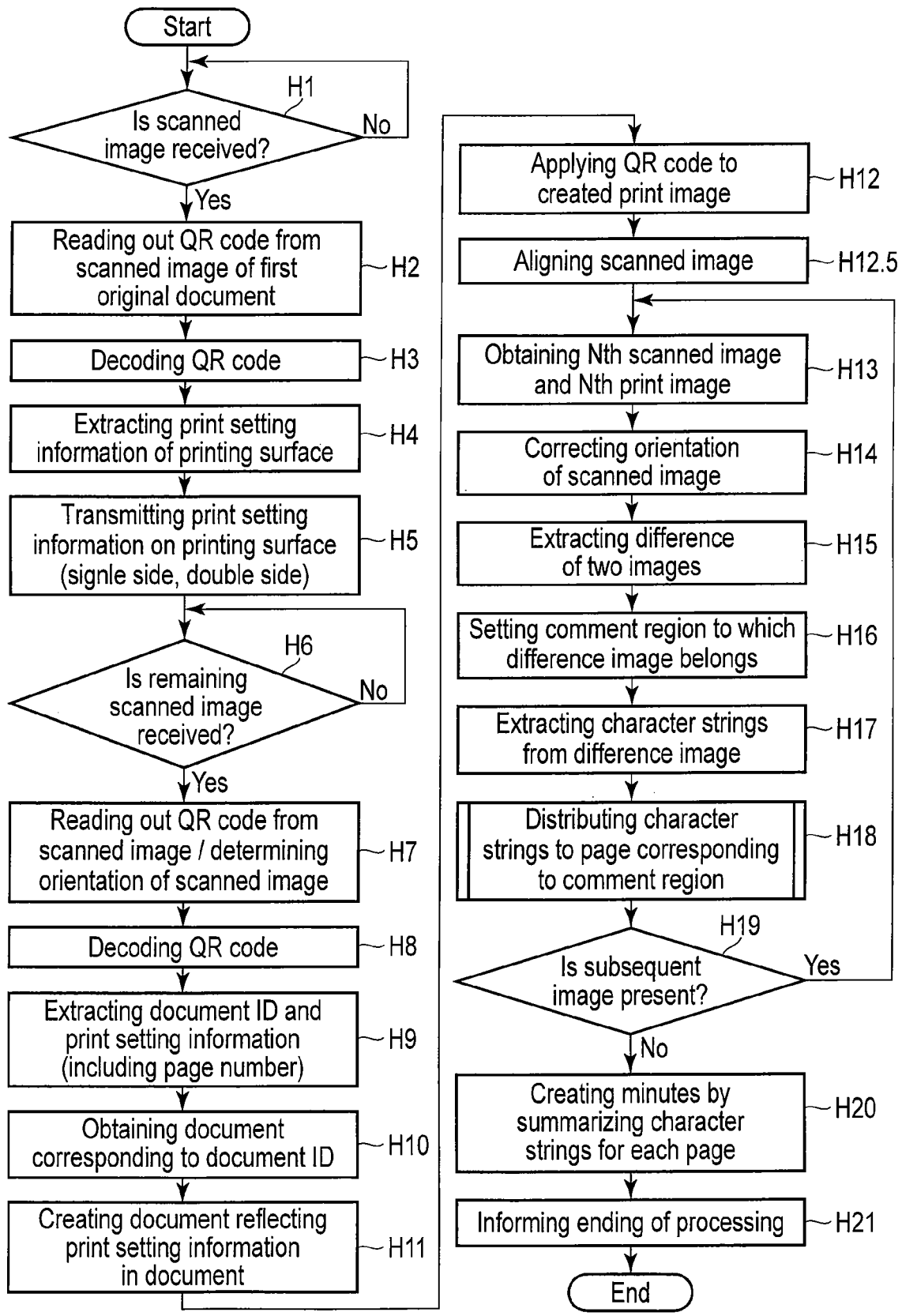
FIG. 26 is a flowchart which shows the processing of the document management server in the embodiment.

Subsequently, the case of "the QR code is printed in all of the documents" in (3) and (4) will be described with reference to the flowchart shown in FIGS. 25 and 26. FIG. 25 is a flowchart which shows the processing of MFP 101 (scanning processing), and FIG. 26 is a flowchart which shows the processing of the document management server 102, respectively. In addition, when the QR code is printed in all of the documents, it is possible to add a print image by generating the QR code so as to include data of number of pages according to the page of the print document, in addition to the document ID and the print setting information.

In the printing processing using the MFP 101, it is possible to arbitrarily select any one of the single-sided printing and the double-sided printing. On the other hand, in the scanning processing, the original document which was subject to the single-sided printing, or the double-sided printing is set to the ADF, thereby starting the scanning processing.

When the QR code is printed in all of the original documents (printing surface), the orientation in which the original document is read out is determined by the position of the QR code which is detected from the read image, and the orientation of the read image is corrected, accordingly, the orientation of the plurality of original document (vertical and horizontal) which is set in the ADF may be any of the orientations, respectively. In addition, it is possible to align the order of the data of the handwritten comment which is read out from each of the original documents, on the basis of the page number, since the data of the page number is included in the QR code. Accordingly, it is not necessary to scan the plurality of original documents by aligning in the correct order, and setting in the ADF. For this reason, since it is not necessary to align the orientation and order of the original document in advance so as to set the document in the ADF, a workload is reduced for a user. However, regarding the document in which the single-sided printing is performed, it is necessary to set the document in the ADF aligning the front and rear surfaces thereof so that the printing surface is scanned.

First, when receiving a scanning command (FIG. 25, Yes in Act G1), the MFP 101 performs the double-sided scanning with respect to the first original document (print document) using the image reading unit 205, and reads out image data (read image) on the front and rear surfaces, respectively (Act G2).

The MFP 101 transmits the read image on both surfaces to the document management server 102, when completing the scanning on both surfaces of the first original document (print document) (Act G3).

When receiving the read image from the MFP 101 (FIG. 26, Yes in Act H1), the document management server 102 read out the QR code from the read image read out from the first original document (Act H2). Since the QR code is printed at a predetermined position of the original document (in the vicinity of the upper left corner), it is possible to read out the QR code in the vicinity of any of four corners whatever the orientation of the original document is. Here, the QR code is read out from the read image on the front surface of the original document.

The document management server 102 decodes the QR code which is read out from the read image (Act H3), extracts the print setting information of the printing surface included in the QR code (Act H4), and transmits the information to the MFP 101 (Act H5).

The document management server 102 executes the scanning operation corresponding to the information, when receiving the print setting information of the printing surface (single surface, or double surfaces) (Yes in Act G4) from the client PC 103.

That is, when the double-sided printing is set, the MFP 101 executes the double-sided scanning with respect to remained documents which are set in the ADF (Act G8), and transmits the read image to the document management server 102 (Act G9).

On the other hand, when the single-sided printing is set, the MFP 101 executes the single-sided scanning with respect to the remained original documents which are set in the ADF (Act G6), and transmits the read image to the document management server 102 (Act G7). In the single-sided scanning, a processing time which is necessary for one sheet of the original document is shorter than that of the double-sided scanning. Accordingly, when it is possible to determine that the original document was subject to the single-sided printing on the basis of the QR code which is printed on the first original document (print setting information), it is possible not to generate the waste processing time, by limiting the processing to the single-sided scanning. This can result in significant reduction of the time as compared to the case of the double-sided scanning in particular when a large quantity of original documents are scanned.

When receiving the remained read image from the MFP 101 (Yes in Act H6), the document management server 102 reads out the QR code from all of the read images, and determines the orientation of the read image on the basis of the position of the QR code in the read image (Act H7). Since the QR code is printed at a predetermined position of the original document (in the vicinity of the upper left corner), it is possible to read out the QR code in the vicinity of any of four corners, whatever the orientation of the original document is, and to determine the orientation of the read image by the readout position.

The document management server 102 decodes the QR code which is read out from the read image (Act H8), and extracts the print setting information (including the data of page number) included in the QR code (Act H9). In addition, since the readout of the QR code is executed in advance (Acts H2 and H3), it is possible to use the data in the previous processing with respect to the read image of the first original document.

Hereinafter, the document management server 102 executes the following processing sequentially from the first image with respect to the read images which are received from the MFP 101. First, the document management server 102 creates the same image as that of the print image in order to extract the difference image from the read image, on the basis of the print setting information obtained from the QR code (Acts H10 to H12). In addition, detailed description of the Acts H10 to H12 will be omitted, since the processes of the Acts H10 to H12 are the same as those of the Acts E5 to E7 shown in FIG. 12.

Since it is assumed that it is not necessary to align the original document in order, and set in the ADF when the QR code is printed in all of the original documents, the document management server 102 aligns the read image in the correct order on the basis of the data of the page number which is extracted from the QR code in Act H9 (Act H12.5).

The document management server 102 obtains the Nth read image (initial value N=1) and the Nth print image (Act H13), corrects the read image in the correct orientation according to the determined orientation in Act H7 (Act H14), and extracts the difference of the two images (Act H15).

Hereinafter, the document management server 102 extracts character strings, or the like from the difference image, and executes a process of determining a page corresponding to a document, and distributing the character strings (Acts H16 to H18). In addition, in the processing of Acts H16 to H18, the detailed description will be omitted, since the processing of Acts H16 to H18 is executed in the same manner as that in Acts E10 to E12 shown in FIG. 12.

In this manner, when the processing of the Nth read image is completed, the document management server 102 executes the same processing as that in the above description repeatedly (Acts H13 to H18), when there is the next read image (Yes in Act H19).

When the processing with respect to all of the read images is completed (No in Act H19), the document management server 102 creates the minutes in which a comment (character string or the like) which is recorded by processing with respect to each of the read images (Act H20).

In this manner, when the minutes in which the handwritten comment is summarized in each page in the print document is created, the document management server 102 records data of the minutes, and informs the ending of the processing to the client PC 103 (Act H21).

In this manner, by printing the QR code in all of the original documents, it is possible to relieve the burden to a user when setting the original document in the ADF. In addition, on the basis of the QR code, by determining the single-sided printing, or the double-sided printing and by executing the switching of the single-sided scanning and the double-sided printing in the MFP 101, it is possible to suppress the wasted processing time.

In addition, in the above described processing shown in FIGS. 25 and 26, the QR code which is printed in the first original document is read out, and the scanning of the MFP 101 is controlled according to the set of the single-sided printing, or the double-sided printing which is indicated by the QR code, however, it is possible to execute the double-sided scanning with respect to all of the original documents which are set in the ADF in the MFP 101.

For example, the MFP 101 performs the double-sided scanning with respect to all of the original documents set in the ADF, and transmits the read image to the document management server 102. The document management server 102 extracts the QR code from the first read image, and executes the same processing as that in the above description with respect to all of the read images which are received from the MFP 101, when it is determined that the double-sided printing is set in the print setting information. On the other hand, when it is determined that the single-sided printing is set in the print setting information, the document management server 102 deletes all of the read images corresponding to the pages of even number (rear surface) among all of the read images which received from the MFP 101. In addition, the same processing as that in the above description is executed with respect to only the read image corresponding to the remained pages of odd number (front surface).

In addition, in the above description, the scanning was executed using the ADF in the MFP 101, however, in the MFP 101, it is possible to execute the scanning when a user set the original document one by one on a scanner surface (glass) of a flat head scanner. When the read image which is read out by the scanning processing is transmitted to the document management server 102, the MFP 101 informs the document management server 102 whether the scanning processing is performed using the ADF, or is performed by scanning (glass scanning) in which a user sets the original document one by one on the scanner surface (glass).

The document management server 102 executes the above described processing with respect to all of the read images which are received from the MFP 101, when it is informed that the scanning is the glass scanning in the MFP 101. That is, this is because, only the printed surface is the target of reading out, when a user performs the scanning by setting the original document one by one. Accordingly, the document management server 102 executes the processing with respect to all of the read images, even when the print setting information indicated by the QR code of the read image is the single-sided printing.

In addition, in the above description, a case where the minutes is created on the basis of the comment handwritten in the print document is exemplified, however, it is possible to create a variety of document files other than the minutes.

In addition, in the embodiment, the correlation between each page and the handwritten characters or the like is determined on the basis of positional relationship between the character strings which are input using handwriting with respect to the printed region of each page of the print document and each page, however, it is possible to determine the correlation using other methods. For example, when a plurality of pages is printed on one sheet of paper (N-in-1 printing), a handwriting input area corresponding to each page is provided. For example, the handwriting input area is secured by performing reduced printing with respect to a text as the printing target, and divides the handwriting input area into areas corresponding to each page. When performing the printing, data which indicates the position of the handwriting input area corresponding to each page is set as the print setting information, and the QR code including the information is printed together with the document. The QR code is detected as in the above description with respect to the read image obtained by scanning the print document in which handwritten is performed in the handwriting input area, and the correlation between the area corresponding to each page indicated by the QR code and the characters or the like (difference image) which are input using the handwriting is determined. Hereinafter, it is possible to create the minutes or the like, in the same manner as described above.

In addition, when the document is printed by applying the QR code, there is a possibility in which the document body (original data) is hidden by the QR code. In order to avoid this, and to secure a region for printing the QR code, it is possible to print the document body (page) by reducing the size thereof, when creating the print image. In this case, a print image is created in which the document body is reduced at the same reduction rate as that at the time of printing, when extracting the difference image from the read image.

Further, it is also possible to set the position of the QR code in the print document at a position in which the document body is rarely present, such as the lower right of the print document, or the like. In addition, one QR code is added onto one printing surface in the above description, however, a plurality of QR codes may be added thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    printing control unit configured to control printing of a plurality of pages on one sheet of paper according to a print setting information which indicates a printing form, and printing of a code indicating the print setting information on the paper;
    image reading unit configured to read the paper;
    extracting unit configured to extract the code from the read image;
    difference image extracting unit configured to generate a print image including a plurality of pages based on the print setting information which the code indicates, and to extract a difference image between the printed image and the read image; and
    determination unit configured to determine a correlation between the difference image and pages included in the printed image.

2. The apparatus of claim 1, further comprising:
    character recognition unit configured to recognize characters on the difference image.

3. The apparatus of claim 2, wherein
    the determination unit further determines a positional relationship between a margin around the page and the difference image based on the print setting information, and
    the character recognition unit sets a direction of character strings based on the positional relationship between the margin and the difference image, and recognizes the characters on the difference image.

4. The apparatus of claim 2,
    wherein the character recognition unit sets the direction of the character strings based on the print setting information, and recognizes the characters on the difference image.

5. The apparatus of claim 1,
    wherein the determination unit determines the correlation between the difference image and the pages, based on a position of the read image in the difference image, and a printing position of the plurality of pages which is indicated by the print setting information.

6. The apparatus of claim 1,
    wherein the determination unit determines the correlation between the difference image and the pages, based on a position of a predetermined shape pattern which is included in the difference image, and the printing position of the plurality of pages which is indicated by the print setting information.

7. The apparatus of claim 1,
wherein the determination unit determines the correlation between the difference image and the pages, based on a printed region of the plurality of pages which is indicated by the print setting information, and an area of the difference image included in the printed region of the plurality of pages.

8. The apparatus of claim 1, wherein
the printing control unit prints the code on the one sheet of paper, when printed on a plurality of paper, and
the difference image extracting unit extracts the difference image between the print image and the read image by each of the plurality of paper, based on the code which is extracted from the one sheet of paper.

9. The apparatus of claim 1, wherein
the printing control unit prints the code on the plurality of paper, when printed on the plurality of paper, and
the difference image extracting unit extracts the difference image between the print image and the read image by each of the plurality of paper, based on the code which is respectively extracted from the paper.

10. The apparatus of claim 2, further comprising:
document creation unit configured to create a document from the characters which are classified into each of the pages, according to the correlation.

11. The apparatus of claim 2, further comprising:
document creation unit configured to create a document in which the characters which are added to the respective pages, according to the correlation.

12. The apparatus of claim 11,
wherein the document creation unit creates a document in which the difference image is correlated with the pages, according to the correlation.

13. A document management server which connected to an input-output device including a function of reading a paper, and a function of printing, comprising:
printing control unit configured to control the input-output device to print a plurality of pages on one sheet of paper according to a print setting information which indicates a printing form, and to print a code indicating the print setting information;
image reading unit configured to read the paper by the function of image reading of the input-output device;
extracting unit configured to extract the code from the read image;
difference image extracting unit configured to generate a print image including a plurality of pages based on the print setting information which is indicated by the code, and to extract a difference image between the print image and the read image; and
determination unit configured to determine a correlation between the difference image and a page included in the print image.

14. The server of claim 13, further comprising:
character recognition unit configured to recognize characters on the difference image, wherein
the determination unit further determines a positional relationship between a margin around the page and the difference image based on the print setting information, and
the character recognition unit sets a direction of character strings based on the positional relationship between the margin and the difference image, and recognizes the characters on the difference image.

15. The server of claim 13,
wherein the determination unit determines the correlation between the difference image and the pages, based on a position of the read image in the difference image, and a printing position of the plurality of pages which is indicated by the print setting information.

16. The server of claim 13,
wherein the determination unit determines the correlation between the difference image and the pages, based on a position of a predetermined shape pattern which is included in the difference image, and the printing position of the plurality of pages which is indicated by the print setting information.

17. A method of image processing comprising:
printing a plurality of pages on one sheet of paper according to print setting information which indicates a printing form, and printing a code indicating the print setting information on the paper;
reading the paper;
extracting the code from the read image;
generating a print image including a plurality of pages based on the print setting information which is indicated by the extracted code;
extracting a difference image between the print image and the read image; and
determining a correlation between the difference image and pages included in the print image.

18. The method of claim 17, further comprising:
determining a positional relationship between a margin around the page and the difference image based on the print setting information; and
setting a direction of character strings based on the positional relationship between the margin and the difference image, and
recognizing the characters on the difference image.

19. The method of claim 17, further comprising:
determining the correlation between the difference image and the pages, based on a position of the read image in the difference image, and a printing position of the plurality of pages which is indicated by the print setting information.

20. The method of claim 17, further comprising:
determining the correlation between the difference image and the pages, based on a position of a predetermined shape pattern which is included in the difference image, and the printing position of the plurality of pages which is indicated by the print setting information.

* * * * *